（12) United States Patent
Rhoads

(10) Patent No.: US 9,858,681 B2
(45) Date of Patent: Jan. 2, 2018

(54) SIGNAL DETECTION, RECOGNITION AND TRACKING WITH FEATURE VECTOR TRANSFORMS

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/924,664

(22) Filed: Oct. 27, 2015

(65) Prior Publication Data

US 2016/0189381 A1     Jun. 30, 2016

Related U.S. Application Data

(60) Provisional application No. 62/069,246, filed on Oct. 27, 2014.

(51) Int. Cl.
*G06T 7/579* (2017.01)
*G06T 7/33* (2017.01)

(52) U.S. Cl.
CPC ......... *G06T 7/579* (2017.01); *G06T 7/33* (2017.01); *G06T 2207/20016* (2013.01)

(58) Field of Classification Search
CPC ... G06T 2207/10016; G06T 7/75; G06T 7/73; G06T 7/251; G06T 7/0012; G06T 7/55;
(Continued)

(56) References Cited

U.S. PATENT DOCUMENTS 7,076,082 B2   7/2006  Sharma
7,787,683 B2 * 8/2010  Khamene .......... G06K 9/00208
                                                  382/130
(Continued)

OTHER PUBLICATIONS

Engel, Jakob, Thomas Schöps, and Daniel Cremers. "LSD-SLAM: Large-scale direct monocular SLAM" In *European Conference on Computer Vision*, pp. 834-849. Springer International Publishing, 2014.

(Continued)

*Primary Examiner* — Stephen R Koziol
*Assistant Examiner* — Shaghayegh Azima
(74) *Attorney, Agent, or Firm* — Digimarc Corporation

(57) ABSTRACT

A method for obtaining object surface topology in which image frames of a scene (e.g., video frames from a user passing a smartphone camera over an object) are transformed into dense feature vectors, and feature vectors are correlated to obtain high precision depth maps. Six dimensional pose is determined from the video sequence, and then used to register patches of pixels from the frames. Registered patches are aligned and then correlated to local shifts. These local shifts are converted to precision depth maps, which are used to characterize surface detail of an object. Feature vector transforms are leveraged in a signal processing method comprising several levels of interacting loops. At a first loop level, a structure from motion loop process extracts anchor features from image frames. At another level, an interacting loop process extracts surface texture, as noted. At additional levels, object forms are segmented from the images, and objects are counted and/or measured. At still a higher level, the lower level data structures providing feature extraction, 3D structure and pose estimation, and object surface registration are exploited by higher level loop processes for object identification (e.g., using machine learning classification), digital watermark or bar code read-
(Continued)

Integer Pixel Oct-Axis

Shifted, Scaled and Rotated

Same operation but with interpolation between pixels ing and image recognition from the registered surfaces stored in lower level data structures.

18 Claims, 10 Drawing Sheets
(5 of 10 Drawing Sheet(s) Filed in Color)

(58) Field of Classification Search
CPC .. G06T 2207/20016; G06T 7/33; G06T 7/579
See application file for complete search history.

(56) References Cited

U.S. PATENT DOCUMENTS

| | | | |
|---|---|---|---|
| 8,687,839 | B2 | 4/2014 | Sharma |
| 9,460,505 | B2 | 10/2016 | Rhoads |
| 9,593,982 | B2 | 3/2017 | Rhoads et al. |
| 2011/0161076 | A1 | 6/2011 | Davis et al. |
| 2012/0196679 | A1* | 8/2012 | Newcombe ............ A63F 13/06 463/36 |
| 2012/0306876 | A1* | 12/2012 | Shotton .................. G06T 17/10 345/424 |
| 2014/0293091 | A1 | 10/2014 | Rhoads et al. |
| 2015/0016712 | A1 | 1/2015 | Rhoads et al. |
| 2015/0055837 | A1* | 2/2015 | Rhoads ................ G06T 7/0012 382/128 |
| 2016/0187199 | A1 | 6/2016 | Brunk et al. |
| 2016/0321827 | A1* | 11/2016 | Xiao ...................... G06T 7/602 |

OTHER PUBLICATIONS

Newcombe, Richard A., and Andrew J. Davison, "Live dense reconstruction with a single moving camera." In *Computer Vision and Pattern Recognition (CVPR), 2010 IEEE Conference on*, pp. 1498-1505. IEEE, 2010.

Gonzalez-Mora, Jose, Fernando De la. Tone, Nicolas Guil, and Emilio L. Zapata. "Learning a generic 3D face model from 2D image databases using incremental structure-from-motion." *Image and Vision Computing* 28, No. 7 (2010): 1117-1129.

Rublee, Ethan, Vincent Rahaud, Kurt Konolige, and Gary Bradski. "ORB: An efficient alternative to SIFT or SURF." In *Computer Vision (ICCV), 2011 IEEE International Conference on*, pp. 2564-2571. IEEE, 2011.

Garrido, Pablo, Levi Valgaerts, Chenglei Wu, and Christian Theobalt. "Reconstructing detailed dynamic face geometry from monocular video," *ACM Trans Graph*. 32, No. 6 (2013): 158-1.

Rosten, Edward, Reid Porter, and Tom Drummond, "Faster and better: A machine learning approach to corner detection." *IEEE transactions on pattern analysis and machine intelligence* 32, No. 1 (2010): 105-119.

* cited by examiner

Integer Pixel Oct-Axis

Shift down and over

Direct Feature Comparison

SIGNAL DETECTION, RECOGNITION AND TRACKING WITH FEATURE VECTOR TRANSFORMS

RELATED APPLICATION DATA

This application claims benefit of U.S. Patent Application 62/069,246, filed Oct. 27, 2014, which is related to U.S. patent application Ser. No. 14/201,852 (US Patent Application Publication 20140293091), 62/054,294, filed Sep. 23, 2014, and Ser. No. 14/836,878 (U.S. Patent Application Publication 20160187199), filed Aug. 26, 2015, entitled Sensor-Synchronized Spectrally-Structured-Light Imaging, which are hereby incorporated by reference. A portion of this specification overlaps with our co-pending application Ser. No. 14/466,869 (US Patent Application Publication 20150055837), entitled Detection of Weak Specks From Imagery, filed on Aug. 22, 2014, which is hereby incorporated by reference.

REFERENCE TO COMPUTER PROGRAM LISTING APPENDIX

This application includes a computer program listing appendix including the following Matlab computer program files, all of which are incorporated into this specification.

| Source code file name | Creation Date and File Size |
| --- | --- |
| camera_transform | Oct. 26, 2015, 868 bytes |
| camera_transformv5 | Oct. 26, 2015, 870 bytes |
| corr | Oct. 26, 2015, 1,550 bytes |
| create_image | Oct. 26, 2015, 759 bytes |
| create_image_4x4kernel | Oct. 26, 2015, 1,023 bytes |
| create_image_4x4kernel_emboss | Oct. 26, 2015, 2,344 bytes |
| create_image_4x4kernel_warp | Oct. 26, 2015, 1,100 bytes |
| create_image_v5 | Oct. 26, 2015, 842 bytes |
| create_img_with_fine_shiftv5 | Oct. 26, 2015, 1,531 bytes |
| create_lut | Oct. 26, 2015, 1,384 bytes |
| create_stamper | Oct. 26, 2015, 1,223 bytes |
| FFT_studyv1 | Oct. 26, 2015, 3,548 bytes |
| FFT_studyv2 | Oct. 26, 2015, 3,614 bytes |
| fit_img_to_freckle | Oct. 26, 2015, 1,503 bytes |
| freckle_Hoodad | Oct. 26, 2015, 820 bytes |
| freckle_meshfit | Oct. 26, 2015, 1,608 bytes |
| freckle_minfind | Oct. 26, 2015, 940 bytes |
| freckle_transform | Oct. 26, 2015, 4,653 bytes |
| freckle_warpDpup | Oct. 26, 2015, 4,019 bytes |
| get_peak | Oct. 26, 2015, 621 bytes |
| GetFFTPatches | Oct. 26, 2015, 1,300 bytes |
| GetFFTPatchesv5 | Oct. 26, 2015, 1,350 bytes |
| GetFFTPatchesv7_off | Oct. 26, 2015, 1,492 bytes |
| GetParallax | Oct. 26, 2015, 366 bytes |
| GetParallaxv5 | Oct. 26, 2015, 446 bytes |
| InitialStudy1 | Oct. 26, 2015, 6,730 bytes |
| InitialStudy2 | Oct. 26, 2015, 7,883 bytes |
| produce_image | Oct. 26, 2015, 549 bytes |
| sixDcamera | Oct. 26, 2015, 42 bytes |
| sixDcameraV1 | Oct. 26, 2015, 5,671 bytes |
| sixDcamerav2 | Oct. 26, 2015, 7,533 bytes |
| sixDcamerav3 | Oct. 26, 2015, 9,196 bytes |
| sixDcamerav3_4Dstable | Oct. 26, 2015, 9,304 bytes |
| sixDcamerav4 | Oct. 26, 2015, 10,026 bytes |
| sixDcamerav4_6DstableWooHoo | Oct. 26, 2015, 10,106 bytes |
| sixDcamerav5 | Oct. 26, 2015, 11,286 bytes |
| sixDcamerav6 | Oct. 26, 2015, 11,519 bytes |
| sixDcamerav6_goodstuff | Oct. 26, 2015, 11,519 bytes |
| sixDcamerav7 | Oct. 26, 2015, 12,376 bytes |
| sixDcamerav7_Coins | Oct. 26, 2015, 10,200 bytes |
| sixDcamerav7_Coins_offshoot | Oct. 26, 2015, 10,480 bytes |
| sixDcamerav8_Coins_offshoot | Oct. 26, 2015, 11,310 bytes |
| tmp_viewer | Oct. 26, 2015, 767 bytes |
| untitled | Oct. 26, 2015, 889 bytes |

TECHNICAL FIELD

The invention relates to extraction and analysis of features from sensed data (e.g., image or spectral sensors) for determining object structure, object recognition, signal detection and various other applications.

BACKGROUND AND SUMMARY

Related background fields for this disclosure include photogrammetry, Structure from Motion (SFM) and related Bundle Adjustment, and Simultaneous Location and Mapping (SLAM) formulations. Software toolkits developed in these fields are used to analyze images, such as a sequence of video of a scene, or a collection of images of a scene from various viewpoints, and extract 3D structure of the scene or objects in that scene.

Our work in these areas stemmed from our interest in Intuitive Computing Platforms (ICPs), in which computing devices, typically mobile devices, are equipped with cameras, microphones, RF radios and a host of other sensors, and process streams of sensor input, to recognize signals and objects around them, discern user intent, and deliver relevant services. See, e.g., our US Patent Application Publication 20110161076, entitled, "Intuitive Computing Methods and Systems," which is hereby incorporated by reference in its entirety. The processes for recognizing signals and objects include feature extraction and feature tracking, image and object recognition, audio recognition, detection of machine readable signals and patterns, etc., with the aid of supporting technologies, such as machine learning, Kalman filtering, and teachings from the above fields. Photogrammetric techniques, like SFM and SLAM for example, are used to extract 3D structure from the sensor inputs in the ICP platform, which in turn, aids in object recognition and identification, and other applications, as outlined in this disclosure.

In this disclosure, we build upon our ICP disclosures as well as our signal processing work described in Ser. No. 14/466,869 (US Patent Application Publication 20150055837), and our multi-spectral and machine learning work described in Ser. No. 14/201,852 (US Patent Application Publication 20140293091), 62/054,294 and Ser. No. 14/836,878, as well as various other cited works throughout. In particular, we describe various forms of feature vector transforms, and use of the feature vector transforms to extract dense feature sets that are exploited in applications. These applications include recovering surface micro-topology (e.g., surface texture extraction from motion), precise object counting and measurement, object recognition and identification, to name a few. Some of the applications are designed to be carried out on smartphones (e.g., with access to cloud computing as needed), while others are adapted for application domain devices, like fruits and vegetable identification in point of sale scanner devices.

One aspect of the invention is a method for computing surface texture in which image frames of a scene (e.g., video frames from a user passing a smartphone camera over an object) are transformed into dense feature vectors, and feature vectors are correlated to obtain high precision depth maps.

In one implementation, for example, six dimensional 6D pose is determined from the video sequence, and then used to register patches of pixels from the frames. Registered patches are aligned and then correlated to local shifts. These local shifts are converted to precision depth maps.

Feature vector transforms that provide dense feature vectors are described, as are several methods and systems for exploiting them. For example, these feature vector transforms are leveraged in a signal processing method comprising several levels of interacting loops. At a first loop level, a structure from motion loop process extracts anchor features from image frames. At another level, an interacting loop process extracts surface texture. At additional levels, object forms are segmented from the images, and objects are counted and/or measured. At still a higher level, the lower level data structures providing feature extraction, 3D structure and pose estimation, and object surface registration are exploited by higher level loop processes for object identification (e.g., using machine learning classification), digital watermark or bar code reading and image recognition from the registered surfaces stored in lower level data structures.

Another aspect of the invention is a method of obtaining surface detail of an object from a video sequence captured by a moving camera over the object. The method provides a camera model and the video sequence. The method determines pose estimation from the video sequence using the camera model and registers images from different frames using the pose estimation. The method performs a feature vector transform on the images to produce N-dimensional feature vector per pixel of the images. The feature vector transform produces for each pixel in an array of pixels, a first vector component corresponding to plural comparisons between a center pixel and pixels at plural directions around the center pixel for a first scale, and second vector component corresponding to plural comparisons between the center pixel and pixels at plural directions around the center pixel for a second scale. The method correlates the feature vector transforms of the images to obtain shift measurements between the images, and obtains surface height detail of the object from the shift measurements.

Feature vector transforms are used to improve pose estimation by providing dense feature sheets per image to refine the pose estimation vector. A feature vector transform is applied to image frames to provide a feature vector per pixel for the pose estimation process. The pose estimation process finds shifts between feature vector arrays and determines the pose estimation from the shifts.

These methods are implemented in software instructions. In one application, the instructions are executed by a processor in a mobile device, which captures the video sequence of an object via a camera.

Another aspect of the invention is a system for obtaining surface detail of an object from a video sequence captured by a moving camera over the object, the system comprising:

means for estimating pose of the object relative to the camera from the video sequence;

means for transforming the images into dense feature vector arrays, the feature vector arrays comprising a feature vector per pixel, the feature vector having a first vector component corresponding to plural comparisons between a center pixel and pixels at plural directions around the center pixel for a first scale, and second vector component corresponding to plural comparisons between the center pixel and pixels at plural directions around the center pixel for a second scale; and means for obtaining surface height detail of the object from the dense feature vector arrays.

In one variation, the means for estimating pose comprises a processor programmed with instructions to:

determine a coarse 6D pose from the video sequence based on a camera model;

obtain dense feature vector transforms of images in the video sequence;

aligning the feature vector transforms with the coarse 6D pose; and determining a refined 6D pose from the aligned feature vector transforms.

In another, the means for obtaining surface height detail comprises a processor programmed with instructions to:

obtain shift measurements between the images from the dense vector arrays; and obtain surface height detail of the object from the shift measurements.

The foregoing and other features and advantages of the present technology will be more readily apparent from the following Detailed Description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Feature Vector Transforms

Figure 1:
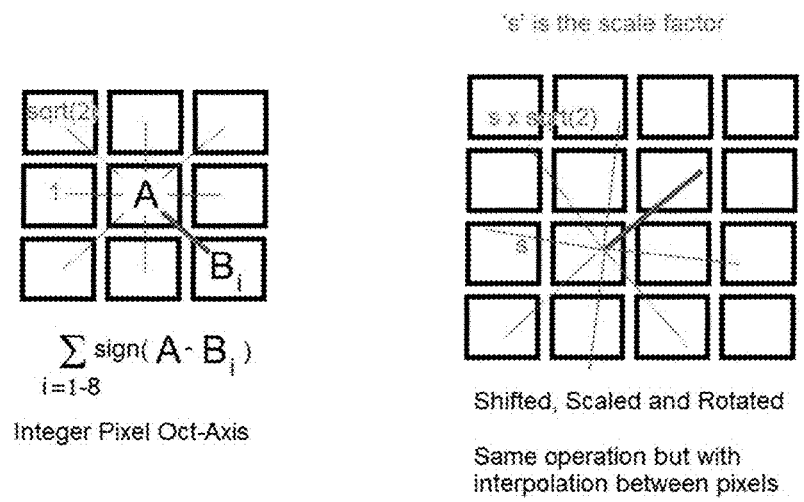
FIG. 1 is a diagram depicting a specific example of a local feature transform that applies an eight-axis filter approach ("oct-axis").

Our signal processing technology takes advantage of a feature vector transform to compute local feature signatures for data sets comprising 2 or more dimensions of samples. We refer to embodiments of the transform as a "freckle" transform. Typically, the data sets correspond to digital representations of sensor input, including image, audio and as well as other sensor input. There are many signal processing used cases where feature transforms apply, e.g., audio signals (1D or 2D time frequency spectrograms), radar signals/images (1D, 2D, 3D), ultrasound (1D, 2D, 3D) and other tomographic imaging, and geological imaging (oil, gas, minerals), and telescopic images of various types across the electromagnetic spectrum, to name a few examples. For more on 2D representations of audio, and audio watermarking implementations, please see U.S. Pat. No. 6,674,876, which is hereby incorporated by reference.

Each sample may itself correspond to a single feature value or a vector of feature values at the sample location. For example, in the case of a color image, the sample locations correspond to pixel locations of a 2D color image sensor array, and the vector of feature values at each sample location are color component values, such as Red, Green, and Blue color values (e.g., CMYK, Lab, CIELAB, CIEXYZ, HSL (hue saturation lightness), HSV (hue saturation value), HSI (hue saturation intensity) and many other color model components). For multi-spectral or "hyper spectral" imagery, each sample may correspond to a vector of spectral values corresponding to measurements obtained from spectral bands. The sample location is often but not necessarily a spatial location. The sample location may also have a time coordinate, such as the time of video frame in a sequence of video frames or audio sample captured in a microphone of a microphone array. Spatial locations may have one to three dimensions (X, Y, Z, coordinates, for example). These are just typical examples of coordinate systems for sample locations, and the locations may correspond to other coordinate systems.

A freckle transform seeks to extract useful relationships among feature values of local groups of samples. Local, in this context, refers to the neighboring features in terms of distance from a particular location in the coordinate system. The freckle transform operates on feature values in a region around a sample of interest, which may be defined as a distance or particular area surrounding that sample. The transform produces an output vector describing a relationship among feature values in that region. As we will explain with examples, the region varies in shape and size with the application and may be adaptive. In particular, we have designed implementations of a freckle transform to provide a compact representation and efficiently computed vector or "signature" representing local relationships.

These local feature vectors are useful for a myriad applications, including, but not limited to weak signal detection, signal or object recognition, signal matching to track common features within two or more data sets (e.g., such as features captured from cameras at multiple locations and/or multiple capture times, etc.), machine learning, etc. We generalize the description of the transform as it may be extended to different signal types and signal processing applications.

In prior work, we have used particular versions of a freckle transform for signal detection (e.g., detecting weak signals representing planets in data sensed from telescopes, or detecting weak signals, such as digital watermarks in the presence of noise in audio or video captured with microphones or cameras). We coined the term "freckle transform" in connection with more recent extensions of the local feature extraction approach to multi-spectral image applications, such as produce (fruits and vegetable identification), and medical diagnostic applications, primarily for skin. In these latter applications, "freckle" refers to local differences on the surface of a fruit or human skin, and thus the name, "freckle." See related U.S. patent application Ser. No. 14/201,852 (US Patent Application Publication 20140293091), 62/054,294, and Ser. No. 14/836,878 (U.S. Patent Application Publication 20160187199), entitled Sensor-Synchronized Spectrally-Structured-Light Imaging, which are hereby incorporated by reference.

FIG. 1 is a diagram depicting a specific example of a local feature transform to introduce the technique. On the left of the diagram, there is a 3×3 block of samples, which may correspond to pixels of an image, for example. In this example of the transform, each sample is transformed by replacing it with the sum of differences between the sample value at the center sample, and the sample value at each of the eight neighboring samples. In other words, the transform applies a filter to each location of an array of locations in a coordinate space of interest. Other variations of the filter implementation are possible, such as by quantizing the output of the difference to a positive or negative value. For instance, this filter may be implemented as a sum of outputs of eight comparator operations, where the comparator output is +1 or −1. At Various alternative filter functions for extracting feature relationships may be efficiently implemented in a look up table configuration. In such a configuration, each comparison is input to the table, and the output is a transformed value corresponding to that input. This approach offers a computationally efficient approach for implementation in a digital logic circuit or software instructions. We sometimes refer to this approach as "oct-axis" where "oct" corresponds to the eight neighbors, and axis is the axis along which the neighboring sample is sampled. For more on this type of an approach, see U.S. Pat. Nos. 7,076,082 and 8,687,839, which are hereby incorporated by reference. The right side of FIG. 1 depicts a generalization where the shift, rotation and scale of the oct-axis filter varies. As shown, a shift causes a spatial displacement, such that the center of the filter may no longer fall on an integer coordinate of the array being sampled. The rotation rotates the axes of the filter. The scale alters the distance from the center of the filter to the sampling location. Due to shift, rotation and scale, the sampling location may no longer fall on discrete coordinates of the array being sampled, and as such, the feature value is interpolated from feature values at neighboring locations of the sampling location. This generalization is useful for applications where there is a need to account for translation, rotation, and scale of the data. For example, this enables signal detection or recognition robust to translation, rotation and scale, as well as sub-sample detection accuracy (and in particular, sub-pixel accuracy for images).

Figure 2:
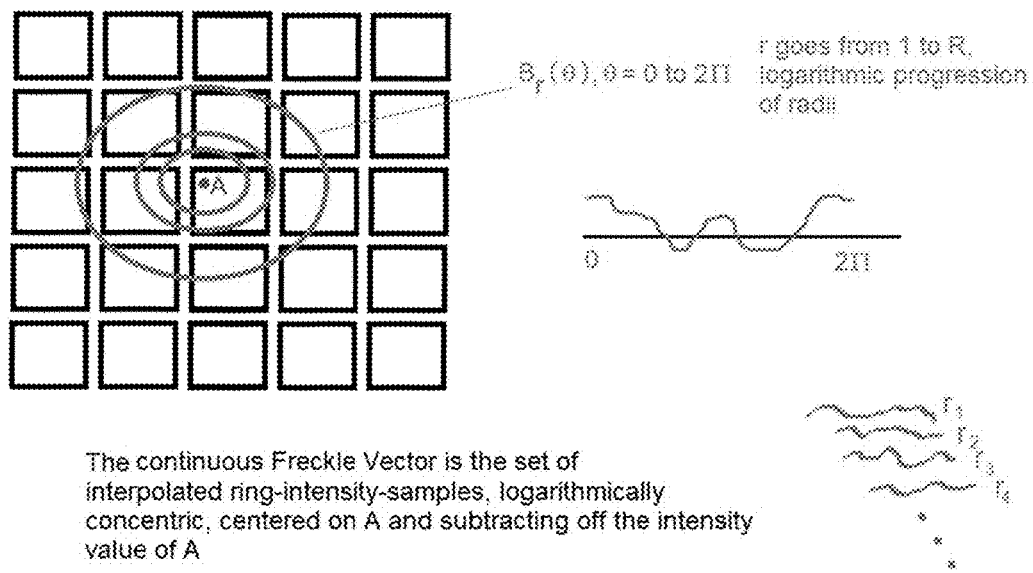
FIG. 2 is a diagram depicting a further extension of the filter of FIG. 1.

FIG. 2 is a diagram depicting a further extension of the filter of FIG. 1. In this case, the value A is the sampled value from the data array at the center sample location, and B now is the value of a neighboring feature along rings centered at the center sample location of feature A. The rings are logarithmically spaced apart in this example, but the spacing may vary according to other functions of the radius. The waveforms on the right side of FIG. 2 provide examples of values of B sampled along a ring, as the sample location is rotated from 0 to 2π along the ring at a given radius. This provides an illustration of how the relationship between the feature value at B varies relative to the feature value at A as a function of rotation angle (i.e. direction and distance of sample location relative to center location). The commentary in the diagram refers to the feature value as an intensity value, yet the particular quantity represented or measured at a feature location could correspond to other quantities at that location.

In the more generalized form of FIG. 2, the transform provides a flexible method for representing relationships among local feature values at each location, A, where the local relationships are computed.

Figure 3:
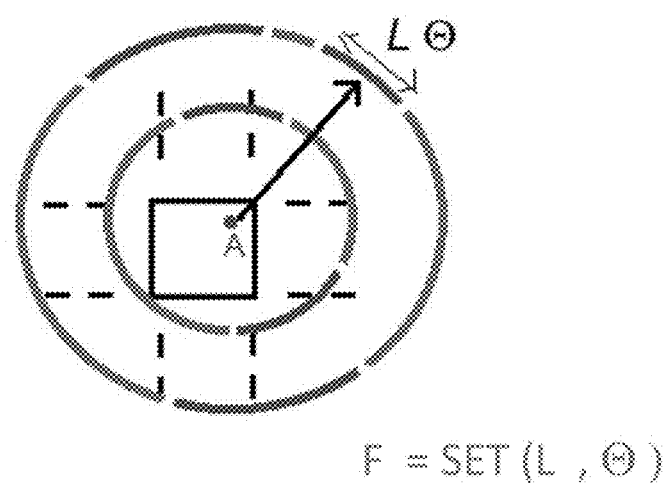
FIG. 3 is a diagram illustrating a local feature transform method that provides a compact representation of the transform.

FIG. 3 is a diagram illustrating a further extension of the method that provides a compact representation of the transform. This representation is particularly amenable to efficient representation in digital logic and software instructions, and makes it amenable to a wide array of signal recognition, classification and machine learning applications. In such applications, vast numbers of signals may be sampled (e.g., through various sensors) and local feature relationships extracted as useful discriminating features for signal classification, recognition and identification. In this configuration, the rings are broken into arcs corresponding to feature values (e.g., intensity values) that are above and below the feature value of A. The result of the comparison of A to B is the same along the arc. For example, when the comparison is quantized to +1 or −1 for A above or below B, respectively, the quantized output of the comparison is the same for discrete locations of B along the arc. Each arc has a "center direction" Θ and an arc length, L. The center direction is the direction of the ray from the location of A to the center of the arc. The set of all segments (for each ring at given radius) and each of their two components, Θ and L, constitute the vector output of the transform for each location of A. The first and higher order derivatives of the ring feature value profile can also be calculated, segmented into two component arcs, and added to a composite vector for each location of A. This provides a compact representation of the relationships between A and locations of B within the pixel kernel.

Figure 4:
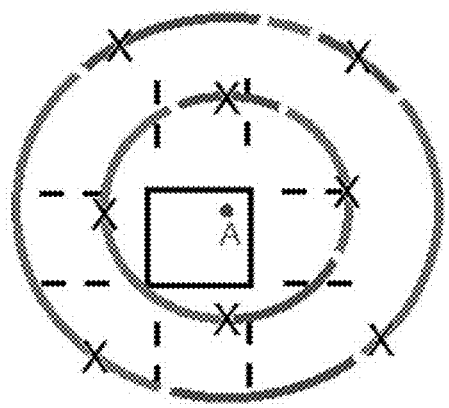
FIG. 4 is a diagram illustrating how the oct-axis filter approach of FIG. 1 fits within the framework of the ring and arc approach of FIG. 3.

Connecting the approaches of FIGS. 1 and 3, FIG. 4 is a diagram illustrating how the oct-axis filter fits within the framework of the ring and arc approach of FIG. 3. The oct axis approach samples two rings at 8 discrete points, each marked with an X. Four of the points are at a ring with radius 1 (inner ring) and four are at a ring at a radius of $2\sqrt{2}$ (the outer ring).

Figure 5:
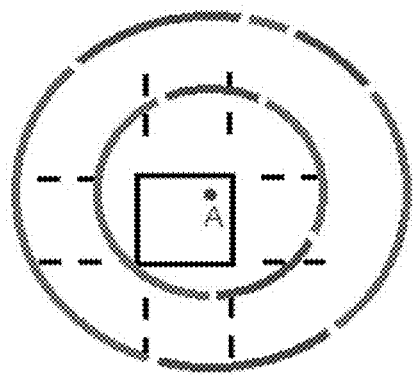
FIG. 5 is a diagram illustrating another variant of a local feature transform.

FIG. 5 is a diagram illustrating another variant. In this example, the output of the transform for each sample point A is a value computed by summing the difference between feature values at A and B, where B is sampled along each of at least two rings, and a weighting factor is included to allow different weights to be applied to the sums of different rings.

Figure 6:
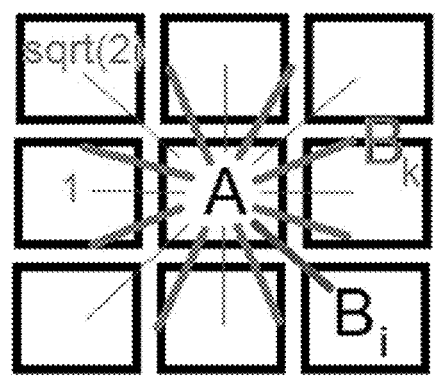
FIG. 6 is a diagram illustrating another variant of a local feature transform.

FIG. 6 is a diagram illustrating yet another variant. This example includes the discrete sampling of the oct axis filter of FIG. 1 ($B_i$ where i is 1-8), and adds 8 more samples at a radius of 1.25 ($B_k$ where k is 1-8).

Below, we refer to embodiments of this feature vector transform producing a N-dimensional vector per pixel. The N in this case is the number of dimensions of the feature vector per pixel. FIGS. 1-6 provide examples illustrating how to build such N-dimensional vectors. One dimension of the vector is created, for example, using the methodology illustrated in FIG. 1. Additional dimensions are provided by including filter output for pixel relationships at different scales. The different scales, for example, are defined by a distance between the center pixel and pixels with which it is compared, as illustrated in FIGS. 2-5. For each scale, the filter output provides a measure of direction and magnitude, which contribute to the number of dimensions of the feature vector. The magnitude provides a measure of how strongly oriented the pixel values are in a direction relative to the center pixel. As explained, the direction may be specified by angle relative to center of the arc, and the measure of magnitude provided in the arc length. In some embodiments, the components of the feature vector for each scale are comprised of a direction and magnitude of a gradient of the pixel values relative to the center pixel value at a predetermined distance from the center pixel.

For example, one embodiment uses a 5D feature vector. A first value in the 5D vector is comprised of a first value formed by the methodology of FIG. 1. Additional values of magnitude and direction are provided for each of two more scales, making a total of 5 dimensions. Another embodiment uses a 7D vector, which adds magnitude and direction components for an additional scale.

Some image feature extraction methods seek to provide higher signal to noise features that perform well for image recognition and image matching operations. One such example is a "corner." One possible drawback of seeking high signal to noise features is that many images may have few such features. This is particularly problematic for applications involving images that are likely to have relatively fewer of such features. For example, images of skin or the surface of produce may have few "corners." Thus, the information content derived from the image is relatively low and performance suffers. The embodiments of feature transforms described above provide greater information content, yet remain effective for image recognition and recovering 3D structure. We refer to this information rich feature transform as one that provides asymptotically-dense feature vectors.

Another advantage of the above embodiments of feature vector transforms is that they are robust to intensity and contrast changes. The relationships between pixel values in the local neighborhood of pixels are robust to these changes, meaning that they are likely to remain the same, in response to changes in intensity or contrast.

Figure 7:
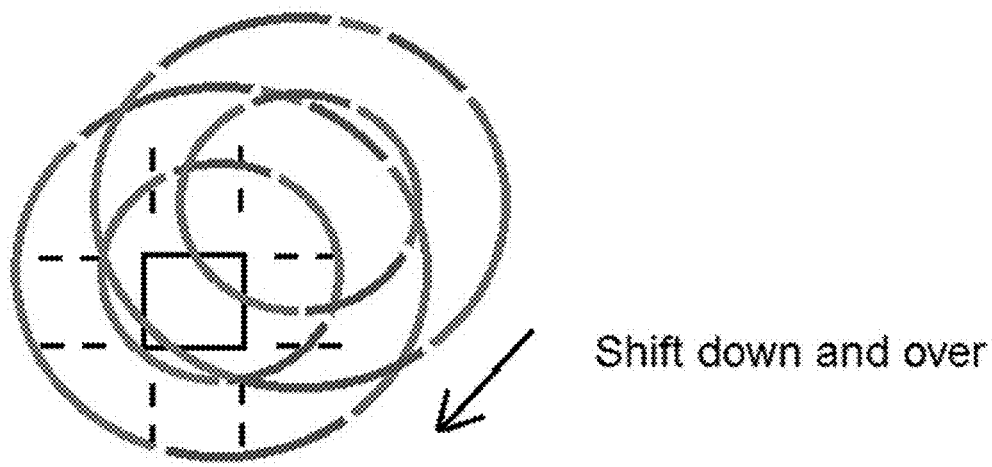
FIG. 7 illustrates an example of how the local feature vector may be used for local shift matching between corresponding features in images or other data sets.
Figure 8:
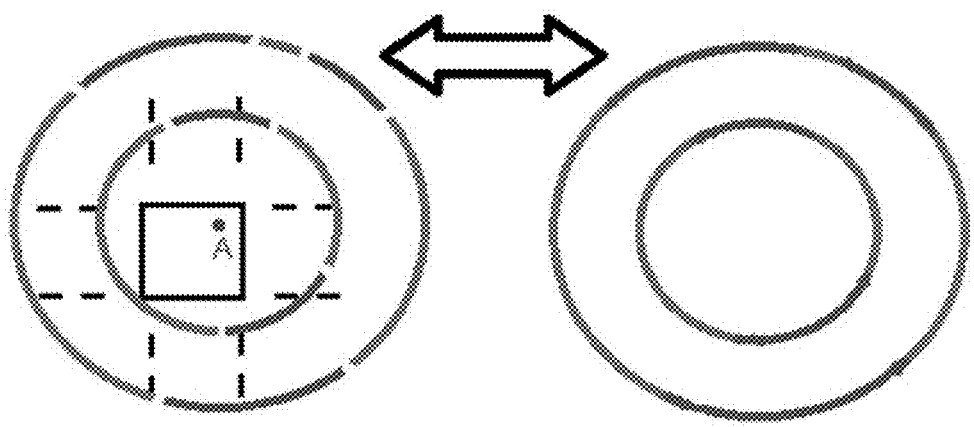
FIG. 8 illustrates use of local feature vectors for direct feature comparison.

FIGS. 7-8 are diagrams depicting a local feature vector transform to illustrate its use in applications. FIG. 7 illustrates an example of how the local feature vector may be used for local shift matching between corresponding features in images or other data sets. This approach may be used to measure spatial shift of corresponding features in image frames captured by a single camera at different times or different cameras at the same time (e.g., in stereo correspondence for example). These operations have application in weak signal detection, obtaining 3D structure from motion, registration or alignment of signals to each other, or to a reference signal, etc.

FIG. 8 illustrates use of local feature vectors for direct feature comparison. This may be used to determine relationship between features in different images or other sensed data sets. For example, one embodiment uses this direct feature for weak signal detection (namely, of sensor data from telescopes for exoplanet detection, in which the signal corresponding to an exoplanet is extremely weak relative to the dominant energy sensed from the nearby star). In this approach, each frame of sensor data is transformed with the feature vector transform. Next, each transformed frame, comprising feature vectors, is selected to be the primary frame, in which the signal detection method then seeks to determine whether there is a signal signature corresponding to an exoplanet at location A. All other frames act as bias estimators. For more information on this application, please see our co-pending application Ser. No. 14/466,869 (US Patent Application Publication 20150055837), entitled DETECTION OF WEAK SPECKS FROM IMAGERY, which is hereby incorporated by reference.

There are many applications of the feature vector transform. In one application noted above, the local feature vector is well suited for capturing the unique spatial "freckles" on various fruits and produce. See, for example, U.S. patent application Ser. No. 14/201,852 (US Patent Application Publication 20140293091) 62/054,294 and Ser. No. 14/836,878 (U.S. Patent Application Publication 20160187199), incorporated above.

The feature vector transform provides for sampling of sensed data (e.g., images, multi-band spectral images, object ID sensor input) that is tuned to textures. The calculation of the values along the rings need not only be done with interpolation kernels. Filtering can be used that is tuned for specific textures or patterns. The value of the outputs of these kernels then produce ring-arc vectors.

This feature vector formulation is well suited for handling scaled and rotated features. Rotations are phase shifts in the ring representation. Scaling corresponds to shifts between radii components of the overall ring-arc feature vector.

In object identification applications, and machine learning more generally, a single sample of an object generates a family of training vectors with different rotations and scales. This approach enables unknown object testing to tolerate any rotation of an object as well as different distances and/or different sizes of objects of similar type.

Many feature vectors accumulated in a given area likely share common rotation and scale properties, allowing further options in terms of recognition certainty and distance to object measurements.

The feature vector is well suited for applications involving micro texture analysis. For example, in computer aided medical diagnostics, micro textures are analyzed to determine if they correspond to particular diseases or anomalies, such as micro textures on skin.

Figure 9:
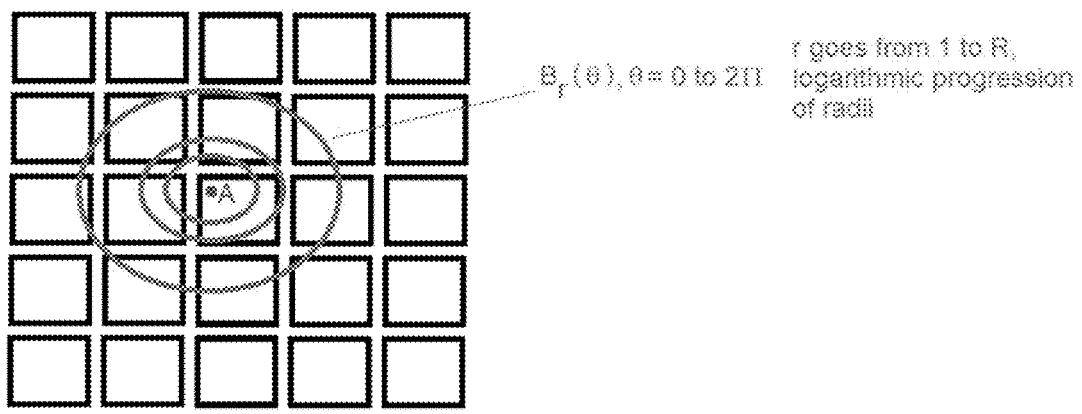
FIG. 9 is a diagram illustrating a generalized version of a feature vector transform.

FIG. 9 is a diagram illustrating a generalized version of a freckle transform. This approach retains the log-ring sampling. B becomes a vector field, and the production of vector values of B correspond to any known kernel or transform of sample arrays, such as FFTs or wavelets. This formulation of the transform provides adjustable parameters that can be adjusted for training a classifier: these parameters include selection of R and radii, discrete spacing, approaches for transforming continuous ring vectors into arc vectors, and selection of the function or transform for producing the B-vector.

Feature Vector Transform Applications: Surface detail from Motion

One embodiment is designed for determining surface topology of an object in a scenario where a user waves a camera (e.g., a smartphone camera) over the object. For instance, in an application of our methods for determining 3D surface topology of a human face, the methods derive the 3D topology from selected image frames captured when a user waves a smartphone camera over his/her face. The target corresponds to an object (including the surface area of interest of an object, e.g., the skin on a face) about 3 to 6 inches away from a handheld camera device. The methodology of this embodiment also applies to objects that are closer to or further from the camera. A particularly useful application is discerning surface topology of the skin of a face.

Figure 10:
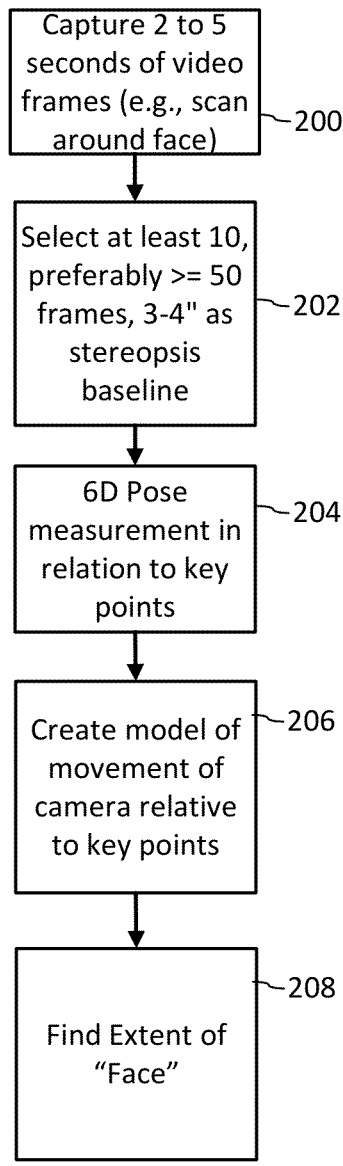
FIG. 10 is a flow diagram depicting initial stages of collecting and selecting video frames, and deriving pose from them.

FIG. 10 is a flow diagram depicting initial stages of collecting and selecting video frames, and deriving pose from them.

Users are taught to 'scan around their face' with the camera of a smartphone for 2 to 5 seconds (200). The motion is meant to capture at least 10 if not more than 50 image 'frames' which are largely in focus but providing horizontal and vertical stereopsis baselines of at least 2 to 3 inches as a full group, maybe even 4 inches (lateral movement across and up/down)(202). The first task is to select frames mainly based on focus. Gyro and accelerometer data is also captured, and synchronized to the image frames. The image data is preferably collected without compression (e.g., no JPEG transform of the frame). The effects of rolling shutter are dealt with late in the process.

The selected frames are initially subjected to a first stage of 6D pose measurement, in relationship to key points on the face (204). A sub-millimeter (but not quite single digit micron) level 'model' of the movement of the camera relative to the key points on the face is created (206). Several alternative models may be used as appropriate for the nature of the target. See, e.g., Gonzalez-Mora, J., De La Torre, F.; Z., Guil, N.; Zapata, E. Learning a generic 3D face model from 2D image databases using incremental structure from motion, Image Vision Comput. 28(7):1117-1129 (2010), which is hereby incorporated by reference.

The model in question has both the 6D pose track of the selected frames and the key-point 3D model of the face. The 'extent of the face' is then found (208), in which sub-millimeter topometry is applied.

Figure 11:
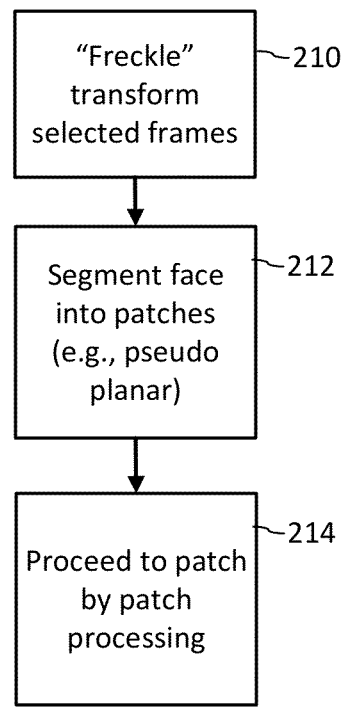
FIG. 11 is a flow diagram illustrating a process of coarse segmentation of selected frames based on features extracted using a feature vector (e.g., freckle) transform.

FIG. 11 is a flow diagram illustrating a process of coarse segmentation of selected frames based on features extracted using a freckle transform. In parallel, all selected frames are freckle transformed into same-pixel-grid 7 dimensional vectors, representing non-linear, near-mid and far gradient vectors (210). We refer to these as 7D freckle transform vectors.

Next, the face model is segmented into 4 by 4 or even up to 16 by 16 'patches' having coarsely defined 'pseudo planar' attributes, with the nose perhaps being more finely 'tessellated' (212). After the processing depicted in FIG. 11, the method proceeds to patch by patch processing illustrated in FIG. 12 (214).

Figure 12:
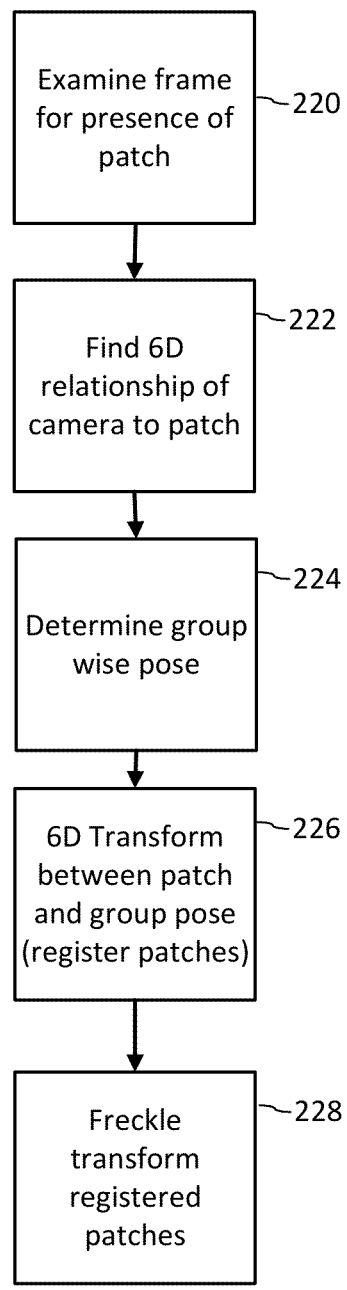
FIG. 12 is a flow diagram illustrating a process of registering patches across image frames.

FIG. 12 is a flow diagram illustrating a process of registering patches across image frames.

Up until the final stage of putting the separately obtained 3D data from each patch, the next few steps are done on the patches. Patch by patch, the selected frames are examined for their reasonableness in containing the given patch, by a 35 degree to 40 degree limit on camera-plane to patch-plane criteria (220). Typically, one quarter to one half of all selected frames will contain contributing data for the patch. A border is applied to image data surrounding the patch, and image data are gathered up from the selected frames.

Next, a 'full patch' 6D pose registration of all the patches to each other is computed. In this process, a cross-group registration is performed which 'fixes' the face patch in question, and finds a fairly precise (sub-millimeter) 6D relationship of the camera to the patch for each and every selected image frame (222). This process is seeded by the global model already calculated, but here refined for the patch in question. A median of the individual 6D pose models of the patches is computed to find a group-wide pose (224). Then, each patch-image is 6D pose (affine) transformed to this group-wide pose, utilizing 2D image interpolation routines (226). If one were now to cycle-view these patches, one would find that they are quite nicely registered but not to an extreme. The differences between images is precisely where the stereopsis comes into play. There are differences due to other effects, such as "glint," which refers to bright spots from reflection of light from a shiny surface.

These well-registered patches are now freckle transformed again (228). Their earlier freckle transforms were used in higher level 'model' building and registration. The detailed stereopsis—image shift—operations have a new stage of freckle transform applied to the patches after they are pose transformed.

Figure 13:
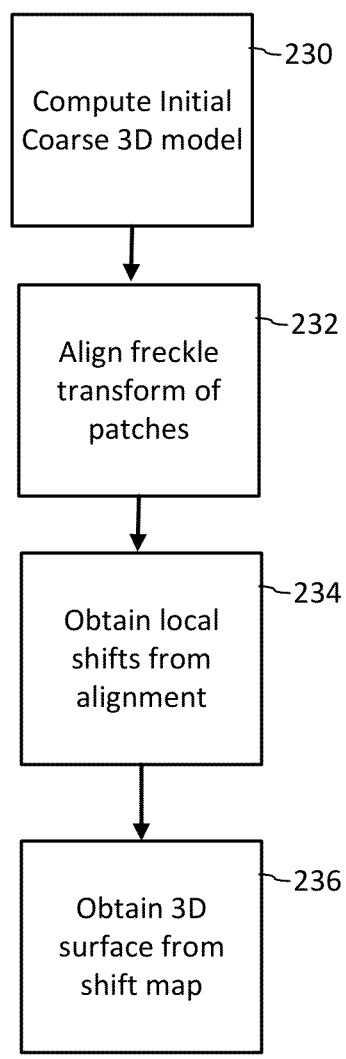
FIG. 13 is a flow diagram illustrating a refinement method for computing a shift map from freckle transformed patches.

FIG. 13 is a flow diagram illustrating a refinement method for computing a shift map from freckle transformed patches. An initial coarse 3D model of the patch is first computed (230). This initial coarse 3D model seeds a refinement method in which the individual freckle transform vectors in each of the patch-frames are correlation aligned with each other, generally in the 10 to 20 pixel kernel range (232).

In one implementation, the correlation is performed using a FFT, as follows: compute FFT of corresponding blocks of Freckle vectors, multiply, and obtain shift corresponding to correlation peak. This is akin to phase correlation between corresponding 32 by 32 or 16 by 16 pixel blocks.

In this case, we are working with 7D vector shift-correlation, however. Careful attention is paid to doing more than simple dot-product correlation. The 'angle between vectors' also comes into play mainly by modifying the dot products during correlation. Experiments have shown that for greater than 2D vector correlation in general, the basic well known dot product can be improved upon, further exploiting the 7D nature of freckle vectors. Another detail is that the ultimate stereopsis shift-matching can either be done on a pairwise image to image basis, or, all images can be produce a 'shared freckle master patch' and then each image is compared to this master.

Either way, the 10×10 to 20×20 pixel small regions are correlation shifted to find a maximum, and the shift ultimately relates to distance according to stereopsis/parallax principles. Each creates its own 'local shift map' (234). At this point, the sub-millimeter and even 2 digit micron level topology of the skin manifests itself as specific shifts depending on where the camera was for each of the image-captures. A shift for each patch is computed: a bit left of the patch, a bit up from the patch, etc. The topology of the skin or generic surface will produce one pixel shifts or more for more topographically obvious surfaces, and sub-pixel shifts for more subtle features such as minor wrinkles, stuble, etc. By collecting data from at least ten different vantage points and with nice baselines both horizontally and vertically, the depth resolution of the resultant 3D map may be improved, e.g., depth resolution to 100 microns.

These approaches equally apply to stereo cameras, not just single lens cameras dominating the smartphone market now.

These methods may be implemented in computer instructions executed on one or more processors, digital logic circuitry built to perform the computations, or a combination of both. In the latter combination, a programmed processor executes some of the instructions of the method on the sampled data stored in a memory (e.g., electronic RAM), and the remaining instructions are implemented in digital logic circuitry (e.g., designed by converting the instructions from Matlab to System C code to VHDL or other hardware description language, and then manufacturing an application specific integrated circuit chip or chips based on the VHDL design).

The accompanying source code listing of a program entitled, sixDcamerav8_Coins_offshoot, provides an example implementation of a computer program for recovering the surface topology of an object or objects from images captured using a mobile camera, waved over the object(s). In this case, the object captured by the camera is comprised of two 1 Euro coins. This program, and associated routines, are written in the Matlab programming language. The instructions may be ported to other languages and computing systems, or converted to digital hardware logic, firmware, or combinations thereof.

In the accompanying source code listings, the following earlier version of this program are also included:

```
sixDcamerav1
sixDcamerav2
sixDcamerav3
sixDcamerav3_4Dstable
sixDcamerav4
sixDcamerav4_6DstableWooHoo
sixDcamerav5
sixDcamerav6
sixDcamerav6_goodstuff
sixDcamerav7
sixDcamerav7_Coins
sixDcamerav7_Coins_offshoot
```

The following discussion details version 8, and the above listed programs are earlier versions of the same program. The remaining source code files accompanying the specification are routines specifically invoked by the main program, alternative versions of such routines, or related code from the same development project. References to the program are by line number, though the reader may need to calibrate line number depending on how the text is re-formatted for viewing.

The program begins by loading a generic camera model (initially with no lens distortion model) as 3D normalized vector fans. See lines 1 through 48.

Next, it places a 'nominal planar scene' at 1 meter distance; and pixel-projection spacing at 1 mm. See line 13. For other applications, these settings can be adapted for the subject matter and camera of those applications.

Next, the program loads image sequence frames captured by a camera hovering about the 1 Euro Coin example (1 Euro coins are 2.33 mm thick with surface relief numerals on the order of 100 microns or less). For convenience, the images are cropped to a square image. See lines 51-66.

For the purpose of 'coarse 6D pose estimation' between the camera and a pseudo-planar scene (such as the coins), the program sets up a coarse (15 by 15) grid-fan of rays that will become the 'shift sampling' center-rays, with the grid covering the entire camera array (as cropped). See lines 72-93.

For each dimension of the 6D degrees of freedom of a camera (distance, x and y translation, pitch yaw and roll), the program calculates the shift-mapping between that dimension and the coarse grid-fan of rays. This becomes a matrix equation relating 2-dimensional image-plane shifts of a scene to each dimension of 6D shift of the camera. See lines 98-110.

Next, the program deals with practical issues such as creating a 'common frame,' where the outer edges of images that are different in different frames are disregarded. See lines 115 to 118.

The program removes the heavy redundancy 'yaw' movement of the camera with x translation, and removes 'pitch' movement of the camera with y translation, by removing the common signal from the pitch and yaw matrix columns. See lines 123 to 126.

Next, the program separates the x and y translation calculation from the distance, pitch, yaw and roll. It then sequentially solves for translation using a complex H matrix, then the latter 4 parameters using a real H matrix. Much of this processing is secondary to the central operation of least-squares data fitting. Quaternion methods can also be employed. See lines 130 to 154.

In version 8 of the program specifically, only frames 3 and 5 of the total 6 were used in order to do a 2-frame parallax comparison. This selection was primarily made because images 3 and 5 were in best focus and had only a few millimeter movement of the camera between the two frames. This particular selection of frames can be seen in lines 172 and 187 of the version 8 program.

Next, the program invokes a freckle transform on each of the frames using 'mode 5' of the freckle transform in the version 8 code. Mode 5 is a 9 by 9 kernel where oct axis-like operations produce a 5-dimensional freckle vector at each pixel. One dimension is an advanced oct-axis value, and then 2 'non-linear direction gradient vectors' are tuned to about 2 pixels scale and 4 pixels scale. See also the additional description of the many options for freckle vectors. The freckle transform is invoked at, for example, lines 174 and 192 of the version 8 code.

The program then uses the outer-scale freckle vectors as the input to the 'coarse 6D pose estimation', which is labelled as 'GetFFTPatchesv7_off' in the v8 code. See line 175 and line 193.

The program then finds the global x and y shift between the two frames under study, and resamples one of the frames at an integral pixel spacing (i.e. 'crop') to more closely align the raw data for the coarse 6D measurement stage. See line 198.

The program then produces the 'raw shift' or 'parallax' mapping between the first image and the second image. This mapping becomes 'parallaxMap.' Viewing this using 'quiver' in Matlab allows one to visually see how one image of the Euro coins generally maps to the other image, minus the translations that were already taken out. See line 211.

With this map as the over-determined shift inputs, the program solves for the 6D pose of the camera. It first computes the x-y translation parameters of the 6D vector. It then removes the translation, and computes the remaining 4 parameters of the 6D vector, namely, distance, pitch, yaw and roll. See line 236 and line 261.

Next, it remaps one of the images onto the other image's pixel grid by inverting the solved 6D pose changes between the two images. At a general level, the main differences between these two images should then be due to distance-based parallax of the scene objects themselves, which in the case of the two Euro coins is the thickness of the coins themselves, along with the 100 micron level relief of the numerals on the face of the coins. See the routine named, freckle_meshfit.

Finally, using the full 5D freckle vectors of the two images, (with one of the images remapped to the other), the program performs local-shift operations in order to pull out z-axis (distance) based parallax shifts between the two images. These shift measurements, in this case, are interpreted as 'differences in height' of the subject matter. Version 8 of the program performs a 'shift and correlate' using the 5D freckle vectors. Then, the highest correlation value for any given 'local shift' is chosen as the height for that region. Minor filtering is also applied. See the routine named freckle_meshfit.

Finally, the resultant 'height map' of the two Euro Coins is displayed, taking the highest value of the correlation operation as 'the height.'

Image Processing Architecture for Mobile Camera Applications

The smartphone age has radically transformed much of so-called normal life. Employing the technology described here, smartphones can be transformed into a powerful measurement tool, answering questions such as: How many leaves are on that tree, and how close together are they on average? What exact nut part number do I need for that bolt I already have? How many gallons of water is there in this pond? And, in texture mode, when is my waxing of this floor good enough, and what exact spots need just a little bit more? Or more prosaically, how big is that fish I just caught? How much did my plant grow relative to one week ago? What is the volume of that container? That box? How many ants are crawling around that hole in the ground there?

Several sections of this disclosure delve into the details of how to empower a smartphone or personal device with a camera to answer these questions. The above techniques using feature vector transforms for extracting dense features from images play a central role in trying to reach the informational limits on what exactly can be accomplished in terms of measuring things in the visual environment, counting things, and general quantifications of physical objects and surfaces. These quantifications then get packaged up into all manner of queries, from the simple to the near-impossibly sublime. Our now familiar UX design of applications, replete with also now familiar 'augmented reality' and verbal interaction with mobile applications, round out the picture as queries are resolved either locally on a device or sent to the cloud for an answer (or further image-processing analysis, then an answer).

A foundational technical theme is precision and accuracy. The 'structure from motion' art has nicely set the table for an intense push toward measurements. Measurements, counting, statistical data gathering are within the rudiments of object identification and categorization. The data gathering act then feeds query-response mechanisms, locally and/or cloud-wise resolved. It is not just about measuring things, it is about providing immediate answers to the implicitly and explicitly asked questions involved with using a smartphone in the classic functionality where the ruler or tape measure is being used today. Then with 'how many leaves or ants . . . ' kinds of questions, brand new measurement capabilities manifest themselves.

The next few sections go into the explicit technical segue between the above use of feature vector transforms to produce and extract structure from dense feature vectors, 'structure from motion' fundamentals, and lands us back to the basics of object parsing and identification (or at least type-casting) followed by 'real-time measurement'. Sections after that expand the notion of measurements beyond just inter-object or intra-object distance. Final sections of this aspect of the disclosure wrap these notions inside 'applications', with a key part of that application being query formation and the query-response backbone and UX.

Structure-from-Motion and Depth-Capable-Cameras

Applicant's Intuitive Computing Platform (ICP) filings addressed 'spatial awareness' in the context of object identification, showing that such awareness can be critical in the task of object parsing and providing object features into a bank of object recognition modules. See, US Patent Application Publication 20110161076, entitled, "Intuitive Computing Methods and Systems," which is hereby incorporated by reference in its entirety. Those practiced in broader object recognition are aware of processes for estimating three-dimensional structures from two-dimensional image sequences, referred to as Structure from Motion (SFM), and its extension, Non Rigid SFM, dealing with a 'non-rigid' nature of the structure of objects being viewed. Progress on these fronts was partially responsible for the more recent rise in popularity of '3D everywhere all the time' kinds of depth-capable cameras and their near real-time understanding of scene depth and distances to surfaces. A first embodiment of a mobile measurement application can, in response to a user selecting distinct points in a display of a scene captured by the camera, provide distance between those points. Further advanced embodiments provide more sophisticated measurement, counting and identification, leveraging object identification and object extents.

The foundation of a mobile application starts with measuring angular distances between objects in a scene, coupled with knowledge of the distance of those objects from the camera at the point in time when the camera captured the scene of objects. Additional information coming from motion sensors and/or compasses on a camera most often play a role in these measurements. Likewise, new generations of cameras are available whereby a measurement of distance is made for each and every 'picture pixel' in an image—so called depth capable cameras. Then, at a high level still, 'bundle adjustment' is yet another technology that can be exploited. Bundle adjustment itself is built on early concepts within stereometry but greatly expands principles of 'image matching' to a full 3 dimensional environment with a camera placed within it, producing ongoing scene images as the camera does, followed by detailed scene point ('feature') matching operations.

Together, and especially with the extensive structure-from-motion activities in the $21^{st}$ century, these represent foundational technologies leveraged in this disclosure and indeed, will provide explicit 'launching points' whereby a certain level of measurement is achieved by leveraging these collective technologies, to then be transformed to a next level of accuracy/precision and utility through additional approaches described herein.

One example of how these technologies can partially combine together is represented by Smart3DCapture® by Accute3D. This is an offering which explicitly involves time and multiple viewpoints of a camera on objects within an environment, culminating in next stages of 3D model meshes upon which surface reflection measurements (the pictures) can be draped. This example provides then a strong cross-correlation into the mature industry of gaming and viewpoints within a 3D modelled world—ours or an artificial world as the case may be with gaming.

A central theme in the transition from this technology to the more advanced measurement applications described here involves concurrent loop processes which map instantaneous 'image-draped surface elements'—such as the ones routinely produced by structure-from-motion and depth-cameras. Using SFM and/or 3D sensors, an instantaneous 'scene' is quickly mapped to a depth-placed representation of the surfaces and to Image (I) features, Morse/morphological (M) features and Profile (P) features described in U.S. application Ser. No. 14/251,229 (US Patent Application Publication 20150016712), entitled METHODS FOR OBJECT RECOGNITION AND RELATED ARRANGEMENTS, which is hereby incorporated by reference in its entirety.

U.S. application Ser. No. 14/251,229 (20150016712), and its parent application, provide details on the definitions of I, M and P features and their relationships to 3D objects in a typical scene. Descriptions of exactly how these features are distinguished from each other, and measured, are contained in those patents and disclosures. This disclosure expands those descriptions more toward real-time loop-based processes which not only speed up the processing of those features, but extend them as well by adding 'time consistency' where over time and from different innate viewpoints, one is able to resolve ambiguities and slowly parse out 'discrete objects' from these otherwise generic depth-resolved scenes. Larger lists of 'candidate' features and 3D forms and object elements routinely get evaluated and whittled down into more definitive and confidence-driven objects.

The approaches disclosed in this document build upon this I, M and P feature measurement transition and culminate in not simply scene-object parsing, but identification of those objects replete with a hierarchy of spatial and quantity defined and then measurements thereof attached. "That's not just a coffee cup, it is one with a Scooby-Doo logo wrapped with a 2 inch radius curvature, and the cup itself can hold 11 ounces of fluid, but it is empty now."

The raw 3D measurements and the first-level raw object parsing and identification then provide feedback information for earlier loop-stages getting us to these capabilities, allowing for further refinements on those earlier stages such that as a camera is further trained on the Scooby-Doo cup for a few more seconds, the manufacturer of the cup can be then identified and the general quality of the cup assessed, including the quality of the printing of its logo. As will be discussed and described, there is more to the external world than pixel-draped surfaces in space—and, once objects are identified and objectively quantified, people want to know more about those objects and interact with those objects.

Quantitative Camera-Device Measurement Applications

We now turn to a specification of quantitative camera-device measurement applications. These applications are set up as real-time, interacting loop oriented processes. These processes culminate with query loops and augmented reality interactive user interfaces.

Figure 14:
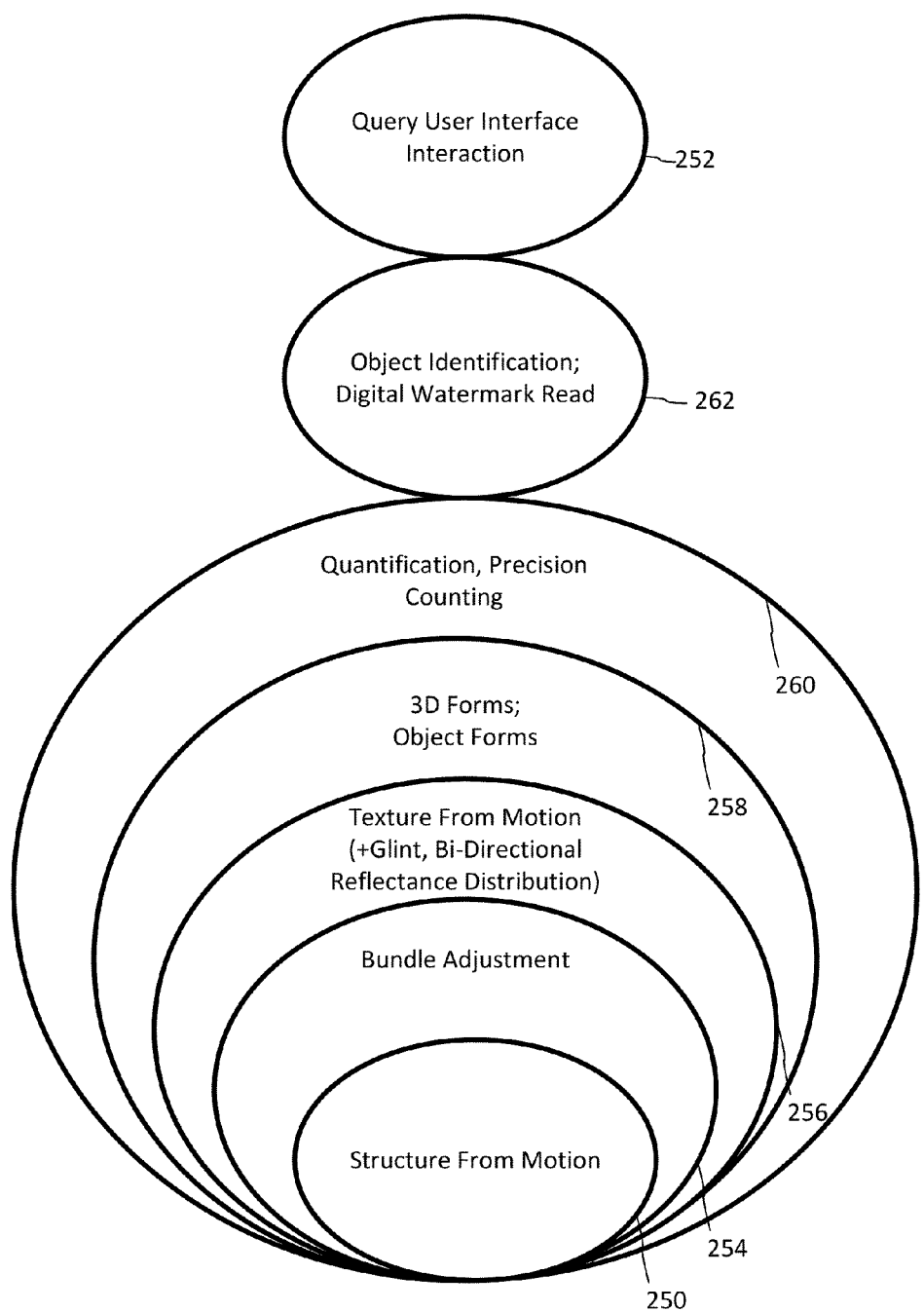
FIG. 14 is a diagram illustrating a framework of loop oriented processes, beginning with a Structure From Motion loop, and then building functionality in additional interacting loop levels for object identification and other recognition and measurement applications.

FIG. 14 is a diagram illustrating a framework of loop oriented processes, beginning with an SFM loop 250, and then building functionality in additional interacting loop levels.

As with many smartphone applications in the 2014 timeframe, the fluid, ongoing operation of algorithms combined with user interaction and display form important underpinnings of the user experience (UX). Automated displays of measurements on a screen, with a 'query loop' running which is responsive to a user seeking further measurement details, represent just the visible user interface 252 of the application. Underlying this visible part are nested algorithmic loops and query-cloud interactions.

For example, a "smart ruler" mobile measurement application processes data structures representing objects recognized within a stream of video captured in the mobile device, displays them on the device's display screen, and automatically overlays prioritized actual measurements directly onto those objects and surfaces of them. As with the human brain in its own process of 'estimating' measurements of one's own immediate environment, there is a great deal of effort 'behind the scenes' which must go on in order to accomplish such measurements (or their estimations). This disclosure uses the term 'loop' to refer to programming and algorithmic processes which can sometimes be simple (e.g., 'count until you receive an interrupt then report your count value and reset your counter'), and oftentimes with this specific disclosure become more complicated (e.g., as will be described more soon: "continually assess the camera's scene, generating 'high Signal to Noise features' which boil down into ever-changing 'anchor features', then publish to other loops the salient information contained in these anchor features).

As stated in this last paragraph, 'interacting' loops pass messages to each other. It will often be the case that one loop cannot do its job without some other loop doing its job first (at least one iteration of the pre-requisite loop, with results then made available to the dependent loop). Such basic programming constructs are well known to programmers of UX-oriented smart phone application, where, for example, an application may routinely access the output of a GPS process publishing ongoing latitude, longitude and elevation to many other applications. Indeed, this disclosure calls out such $3^{rd}$ party data supply looping processes such as a camera itself producing visual scene data, GPS data outputs, accelerometer data loops, gyroscopic data loops and so on. Any 'data source' on a camera-device can be viewed as a looping process producing real-time data derived from the state of the device and what it might be looking at, hearing, and in the motion sense, feeling.

The next few sections set the physical stage for a typical camera-device replete with additional data sources, along with descriptions of the processing power on such devices; the communications capabilities they have; and their ability to negotiate how processes distribute 'locally' on the innate resources of the device, as opposed to 'in the cloud' where certain data is first sent to cloud servers, with data results expected at some nominal lag time later from the cloud.

A Camera-Device with Positional Awareness

As explained further in the device architecture section below, mobile devices, such as today's smartphones and tablets, are typically equipped with sensors and associated processing units and software libraries with Application Programming Interfaces (APIs) for providing video image sequences, depth information (e.g., pose, 3D structure of a scene depicted in this video), position and motion from gyroscopes, accelerometers, magnetometers, etc.

With respect to image sensing and processing, mobile device architectures are now more commonly including two or more cameras, DSPs, Visual Processing Unit (VPU), GPUs, and software libraries that augment the image processing capability of the device. Image processing used in our embodiments may leverage this capability where available, in addition to application software executing on the CPU, as well as software executing on servers in a cloud computing environment. Depth information for pixels in video frames captured by the camera of the device may be provided by a depth capable camera sensors, such as those employing light coding technology. Depth information may also be provided by stereo matching and/or SFM processing that derives depth from multiple camera views (views from multiple cameras on the device and different temporal frames of video from a particular camera).

Here we highlight a few examples of image processing units and software that provides this functionality, just to highlight current capability that various embodiments may exploit. Movidius LTD. provides the Myriad 2 chip and software, a later version of the image processing chip in the Tango smartphone from Google. The Myriad 2 hardware and software platform comprises a complete set of interfaces, a set of enhanced imaging/vision accelerators, a group of 12 specialized vector VLIW processors called SHAVEs, and an intelligent memory fabric that pulls together the processing resources to enable power efficient processing.

Examples of depth capable image sensors include Kinect sensors from Microsoft and Carmine and Capri sensors from PrimeSense, now owned by Apple, Inc. These are being integrated into mobile devices or provided as peripherals for such devices. An example of such integration is Google's Project Tango, in which Google built a smartphone with the PrimeSense Capri PS1200 3D imaging system on a chip. This technology acquires depth of pixels in a scene by light coding technology. The process codes the scene with near-IR light, light that returns distorted depending upon where things are. The process then uses a standard off-the-shelf CMOS image sensor to read the coded light back from the scene using various algorithms to triangulate and extract the 3D data.

Computer Vision software libraries built for mobile platforms, include Qualcomm's FastCV designed for ARM-based processors and tuned to take advantage of the Snapdragon processor (S2 and above) from Qualcomm. Image recognition and augmented reality applications are available that are built on such libraries, such as Qualcomm's Augmented Reality (AR) SDK, also known as Vuforia.

Defining the Visual Data Sensor Space—Floating Point (Continuous), Multi-Plane if Color/Spectral While the above chips and image processing software bundled with them provide depth or structure at a lower spatial resolution of a pixel or pixel group, certain of our embodiments provide intra-pixel resolution.

Defining the Discrete Data to Continuous Data Interpolation Function

As noted above, and further below in the device architecture, mobile devices now typically include GPUs. With this capability, 4×4 kernel operations can be executed on GPUs, and thus, support real-time or low latency operations in which the video stream is consumed, processed and displayed along with underlying derivations of structure and texture.

Defining 'Classic Feature Descriptors' used in the Anchor Loop

Words such as 'features', 'interest point.' 'corners', 'edges' and a host of single and multiple word variations have been used to describe, effectively, the lower dimensional spatial combinatorics of kernels of pixel values (e.g., brightness values). Some of the algorithms in this category, include, for example Moravec corner detection, Harris and Stephens/Plessey/Shi-Tomasi corner detection, Forstner corner detection, multi-scale Harris operator, level curve curvature approach, LoG, DoG, and DoH feature detection, and Affine-adapted interest point operators, to name a few. As is apparent from this list, there are algorithmic approaches to find and track stable objects in a scene of a video sequence, and more specifically, the individual elements of an object giving rise to changes in pixel values.

Known challenges arise in applying these concepts to 'profiles' of an object, profiles which occlude more distant surfaces or objects, but structure-from-motion developments have long since broken out of the semantic difficulties posed by trying to use words to describe low dimensional features. Furthermore, to wit: L, T, Y and X have been used as letter descriptors of local image attributes, with the tacit acknowledgement that even these letters point to a high dimensional space of local pixel combinations with spatial-scale properties attached.

The skilled artisan is presumed to be familiar with the art of feature extraction and associated optimized algorithms. Please, see, for example, E Rosten, R Porter, T Drummond, Faster and better: A machine learning approach to corner detection, Pattern Analysis and Machine Intelligence, IEEE Transactions on 32 (1), 105-119, January 2010, which is incorporated by reference as one representative example of feature extraction technology and its optimization in the art.

In subsequent sections, the 'Anchor Loop' is described which, builds upon these feature descriptors and the optimized algorithms associated with them. Speed and robustness are important design considerations in the Anchor loop. By and large, the mantra of the Anchor Loop is 'find the best of the best, and then use it'. Structure-from-Motion, in real-time or near real-time, is a useful technique for setting up the fundamental geometry of 'camera moving within objects' framework, then using these mature feature description and detection algorithms as quite literally the 'anchor' for real-time applications.

For this section, the specific feature extraction algorithms cited and described in Rosten et. al. paper cited above serve as alternative embodiments for the anchor loop as will be further described. Variants and extensions to these specific algorithms will be described.

Defining the Various Feature Vectors and Feature Vector Transforms Beginning to be Used in the Model Loop, then Becoming the Core Dense Features Utilized in the Emplaced-Scene Loop Earlier in this disclosure, we described feature vector transforms, provided examples of 'Freckle Vectors' and described use of such vectors to derive dense feature sets for each image or patch in a series of image frames or patches. Those earlier sections, this section here, and later sections will further describe these notions and their relationship to 'the classics' as described in the previous sections.

The dense feature sets obtained from applying feature vector transforms to images provides a 'carpet of features.' In considering the useful information content that such a dense feature set provides, we pose the question: what is the asymptotic limit of 'feature information' within any given fixed-in-time image? Dr. Shannon's spirit is hereby called upon to help us out with the philosophy. A bit ironically, there will no doubt be asymptotically better answers to this question as 2D-spatial pixel combinatorics become better defined and their properties explored. Picture in your mind an image of sand paper from a reasonable distance, where the pixel spacing and the individual grains of sand begin to merge: one is tempted to ask 'how many features are in that image?' But with carpet of features, we try to come at this latter question from a less semantic angle.

The above described feature vector transforms are applied to images captured by the camera device to produce arrays of feature vectors corresponding to pixel locations within each of the images. In this process, it is not necessary to attempt to define 'corners', 'edges' or any other such higher level structure. As explained above, the feature vector transforms, such as the examples of freckle transforms provided, are designed for robustness against contrast and perspective changes, isolating the core combinatorics of the above-below relationships at a pixel by pixel level. Feature vectors computed for an image may have 'redundancy,' but the shifting ensures not exact redundancy. The application of the feature vector transform produces an N-d vector corresponding to an image location with simplified rotation and scale properties, where N corresponds to the dimension of the feature vector. These higher dimensional feature vectors are particularly useful as inputs to machine learning approaches. Examples of feature vector transforms include oct axis, generic oct axis, or other approaches described above and illustrated in FIGS. 1-9.

The carpet of features may be represented as a dense data structure of feature vectors, per sample location, that defines a 'Carpet Grid,' often being synonymous with the pixel grid of the camera.

Turning the Device-Camera on: The Various Data Sources Start Making their Data Available Loop 1: Anchor Feature Loop "Anchor Interpose"

The anchor loop (e.g., 250 in FIG. 14) implements SFM processes to extract depth from the video sequence. One approach to implement a SFM loop is to use the software code of an existing SFM toolkit for execution within a mobile device's computing architecture, which includes a CPU, GPUs/VPUs, and DSPs. Examples of SFM toolkits include Vincent Rabaud's SFM toolkit, called vincents-structure-from-motion-Matlab-toolbox. The anchor loop 250 implements an SFM process in this way, and provides hooks to set up and enable interaction with later stages. Anchor loop may include or operate in conjunction with bundle adjustment loop 245, which is part of the above toolkit. Later stages have 'hooks back' into the anchor loop, performing a kind of quality-assurance feedback loop and assisting in resolving certain ambiguity points within the anchor loop process.

The software code of this loop extends the above structure from motion but with an anchor feature candidate hopper feeding a multi-frame anchor feature selection stage. This code also includes time tracking of those two, and 'continuity algorithms' applied to the anchor features which are selected (minimum and maximum numbers). The code at this loop, in one embodiment, tracks sparse corner features (e.g., 'sparse feature' states). Freckle vectors are used to provide more information than the sparse corner feature set if the corner features are too sparse or have a low signal to noise ratio. The goal of this loop is coarse stability and providing the reliable 'structure from motion' mathematical/pose framework that the rest of the applications will rely on. In this loop, baseline error clouds on camera and anchor features are introduced.

Loop 1 output: The output comprises an initial full 3D pose model with camera and features, and error cloud overlays. These features can be animated over time by graphically depicting on a display the anchor features as 'type icons,' not necessarily the initial pixels from which they are derived.

Loop 1 also has the following conditional operations that may be executed if certain conditions are present. Examples include using a depth map from a depth capable camera to assist the loop 1 process in its initialization and initial error bar formulations.

Loop 2: Physical Camera Model Loop "Model Interpose"

This processing loop brings in the device positional data sources and then blends them with loop 1 outputs. This loop also performs level one freckle transforms to generate freckle vectors for captured image frames and combines them with the chosen anchor features from loop 1. These two combined visual feature sets become the initial carpet weave background mesh, not quite the individual carpet threads yet. The stiffer background weave which is still geared toward refining the full Interpose relationships between camera and the major scene elements and properties. Much of our mobile measurement application's needs start to be met here in stage 2, where the feature set expands, rudimentary shape and line relationships become 'classifiable', error clouds placed around all elements including the camera 6D pose set with the scene coordinate system, with then 'distances between elements and the errors of such' being the natural consequence. The next loop can certainly still refine error clouds as well as 'scene object ID and characterization'.

Loop 2 output: The output of loop 2 processing is similar if not identical 'element listing with camera' interpose animation as loop 1, but now denser, and placed in the scene coordinate system, and now with $1^{st}$ level descriptors on scene features, good motion vectors on the camera model, etc.

Loop 2 also has the following conditional operations. If the camera device provides GPS data or accelerometer data or gyroscope data, or magnetometer data, then these new data sources assist Loop 2's execution.

Loop 3: Full Emplaced-Scene Loop "Scene Interpose"

Level 2 Freckle Vectors applied to all frames in a multi-frame sequence, with subsequent full-blown 'shift-fold-tear' analysis applied across frame-2-frame and across N frames too, i.e. continuity of specific carpet features across more than 2 frames. I, M and P features of our co-pending application Ser. No. 14/251,229 (20150016712) also are computed and explicitly extracted in this loop. The fundamental basis of 'micro-stereoscopy' but across N frames, not just 2, is provided in processing Loop 3, with $<\!\frac{1}{10}^{th}$ pixel shift precisions routinely sought. At this stage, the mensuration capabilities of the mobile measurement application are improved, and its ability to discriminate objects and surfaces are refined, so that it can now 'measure distances' not just between point A and point B, but measure areas, volumes, 'swept volumes' over time, which all sets up the interpose framework for 'counting' and statistical estimations where clean discrete objects dissolve into 'too many things to discretely count' such as for example, grains of rice or sugar.

The main capabilities or our texture analysis application are enabled in this loop. However, in a subsequent texture loop, third level freckle vectors are still possible which hone in on very specific texture properties.

Referring to FIG. 14, loops 2 and 3 may be implemented as processing loops within loops 256 and 258.

Texture from motion in loop 258 refers to the above processing in which surface detail is extracted using dense feature vector transforms.

These processes may also include methods for identifying and handling glint (specular reflection, or shiny spots that lead to errors in subsequent recognition if not dealt with) as well as bi-directional reflectance distribution functions (BRDF). For more on these topics of glint and BRDF, please see Ser. No. 14/201,852 (U.S. Patent Application Publication 20140293091), 62/054,294 and Ser. No. 14/836,878 (U.S. Patent Application Publication 20160187199), which are incorporated above.

The extraction of 3D or object forms in loop 258 refers to processing for segmenting objects and deriving data structures characterizing object surface (e.g., such as the quasi planar surfaces in the above described application for faces). These surfaces are registered relative to the 3D model of the object and camera model.

With initial object forms identified and registered within the model, loop process 260 provides methods for counting objects in the scene (quantification or precision counting). The detail afforded by the feature vector transforms enables higher precision object form detection, and thus, high precision counting.

These loop processes establish data structures describing the geometry of objects and their surfaces, as well as registration of pixel patches and feature vectors to this geometry. This enables machine learning based object identification 262 to be executed on the object data using for example, machine learning techniques of Ser. No. 14/201,852 (US Patent Application Publication 20140293091), 62/054,294 and Ser. No. 14/836,878 (U.S. Patent Application Publication 20160187199). Digital watermark and barcode reading 262 is also performed on registered images. The geometric model of the surface provides a description of the geometric transformation of the surface relative to the coordinate plane in which the digital watermark is embedded. This model enables the processing loop to compensate for more aggressive forms of geometric distortion of the watermark signal. Watermark signal registration techniques are described, for example, in 2012-0078989, which is hereby incorporated by reference. Watermark registration and reading are also described in U.S. Pat. No. 6,614,914, which is also incorporated by reference. Methods and structures for digital watermarking embedding and reading are described in detail in these incorporated patents.

Near-Sensor and On-Sensor Feature-Motion-Primitive Processing

This section further describes how carpet-of-features processing can be implemented in hardware, either on a chip right next to an imaging sensor, or directly on the imaging sensor (often referred to as SOC or System on a Chip). Performing these operations in real-time on cameras producing images at greater than 1 frame-per-second can allow for immediate low level parsing of edges, corners and connected-sheets of features, which then support segregation of features into I, M and P features as previously described. This fast determination of features into A) on-object, B) fold-in-object, and C) edge-of-object then allows for near instantaneous parsing and identification of objects in a scene, feeding as they will classic 'image recognition' algorithms as well as the 3D-savvy object recognition algorithms. Examples of the latter include those embodied in applicant's co-pending patent application U.S. application Ser. No. 14/251,229, entitled METHODS FOR OBJECT RECOGNITION AND RELATED ARRANGEMENTS, incorporated above. The user interface of the mobile device, as described previously, can then exploit this fluidity of recognition of objects, with subsequent sparking of cloud-side processes related to a user's interests matched to the identity of those objects, thus enabling immediate interaction with those objects through virtual reality or any other preferred form of thing-interaction.

Companies such as Nvdia and many others have greatly matured and industrialized 'kernel based' processing of pixel data, rolling up into the now-well-known GPU acronym. Their application target has largely been toward 'display of imagery', though the infiltration of GPU's alongside CPU's has generated a revolution in more generic processing applications where 'at least 2 dimensions of data' can now be efficiently processed in hardware. Mathwork's Matlab program, as but one example, allows for broader exploitation of this rapid, greater than 1-dimensional processing power of GPUs, where engineers, scientists, algorithm authors and even gaming pioneers can have finer controls on CPU/GPU processing. 'CUDA' processing tools are the popular and highly utilized platform allowing for the most general kinds of GPU tasking.

Movidius is a company which refers to it processing units, effectively, as the 'GPU equivalent' for visual processing, namely a Vision Processor Unit or VPU. In a most generic processing sense, they are also concentrating the details of their chip design and processing toward greater than 1 dimensional data, with a highly explicit target of 'visual' processing, or, in lay terms, taking the output of optical sensor arrays (cameras) and crunching the data for applications. 3D capable cameras exemplified by the Google Tango project is one of their important early achievements. To applicants' current knowledge these offerings are implemented as a chip which can be placed 'near' an optical sensor, and it is no doubt just a matter of time that either this company or some set of competitors (most definitely including sensor companies themselves, such as Omnivision, Pelican, Lattice/Helion or Aptina) will begin to integrate these greater than 1 dimensional processing capabilities directly onto 'the die' or 'stacked dies' of a single 'sensor part' to use manufacturing vernacular. See, for but one of several examples, of image processors and system on chip devices from On Semiconductor (formerly Aptina Imaging).

These near-chip and on-chip processing capabilities very close to parallel outputs of raw image data are exploited for the implementation of this section's disclosure. Much of the earlier disclosure on 'freckle vectors' and carpet of features and texture-from-motion can certainly be implemented 'off line' from the primary stream of greater than 1 frame per second image data, but for any application where 'fluidity in the user experience is a primary element of user adoption, implementing these inventions 'near-sensor' and 'on-sensor' enables such fluid user experience on the display of a mobile device (e.g., smartphone or tablet with camera and other position and motion sensors).

The various types of previously described feature transforms, including 'freckle vectors,' are the starting point for details. Mathematically, these operations described are 'kernel based', i.e., they define 'a neighborhood of data', where that data is greater than one dimension in nature. Hence, these approaches to extracting features from image data are well suited to GPUs, VPUs and these broader trends toward SOC processing directly on optical sensor parts.

Keeping the goal of fluidity of user experience very much top of mind, and also acknowledging that no matter how powerful GPUs, VPUs and Sensor-SOCs become, there will always be the need to economize the number and complexity of data-operations relative to some specific application goal. If nothing else, battery-drain is the ultimate trump card for this principle. The fast non-linear 'direction-maintaining' processing inherent in a freckle-transform fits this economizing principle nicely. The generality of the freckle-transform allows for an inherent tuning of operations-per-pixel against any given application goal: crank it up for harder scenes with many complicated and 'fuzzy' objects present and power consumption is not a problem; or crank it way down when the battery power is draining away. The 'direction-maintenance' referred to above is meant to make the explicit connection between freckle data and classic 'features' such as corners, edges, etc. A key property of 'good usable features' is that they have ideally more than just a simple location, they include higher dimensional attributes such as directionality of edges of morphological orientations of corners. This is an advantage off freckle transforms, intending as they do to reach asymptotic densities of 'oriented features' as a function of some operations-per-pixel specification. Their non-linear properties are directly addressing visual processing details such as dealing with glint on objects, rapid variations in lighting of objects that are not really related to the object itself, slight changes in a camera's orientation relative to objects (or vice versa), etc. These and previously described properties of kernel-based non-linear feature extraction roll up here into what can be called Feature-Primitives extraction: The explicit tasking and programming of these greater than one dimensional processing capabilities are thus producing feature-primitives all the time, all across an image as a singular image comes off (digitally) an active sensor. They are not yet 'a corner' or 'an edge' or 'a face' . . . they are a form of more primitive vocabulary of image data relationships which can then be fed to higher level processing stages if need be. But as importantly, they also are embodying the 'carpet of features' directly in the freckle-transform values, such that as a second frame of data ⅟₃₀ of a second later is processed in like manner, these primitives themselves can become the 'tracked, matched, correlated and one-to-one mapped' data structures used in stereoscopy (parallax), bundle adjustment, structure-from-motion 6D pose tracking, and, with emphasis in this section, the data structure basis for starting to parse out on-object features from their morphological and 'object edge' characteristics.

Effectively, this latter paragraph posits a second co-extensive 2 dimensional data surface to the raw image data surface itself. Colloquially, this is simply a transform data structure, much like a 'filtered image' can be a separate memory structure than the raw image data memory. The data structure of the previous paragraph is effectively the feature-sheet that is precisely mapped to the raw image of one single frame. The ensuing dynamics of this feature-sheet memory plane then can be viewed as its own 'movie', giving rise to higher level visual processing which keys in on 'feature motion'.

The sheer concept of a processed data structure memory, co-extensive with 'an image memory frame' is not at all new. Double-buffered frame grabbers where one buffer takes in raw imagery, and the other accepts filtered versions thereof, is well known. An animal's visual cortex and the higher level 'processing centers' that it serves can now be appreciated as maintaining certain levels of 'spatial organization' (co-extensive registration if you will), where spatial-relationships of object features can survive up through several layers of neural processing. GPUs, VPUs and Sensor-SOCs all inherently create co-extensive, spatial-relationship-preserving data structures as a core part of their 'output' processing. The previous paragraphs teach using such memory structures, with the preferred embodiment of non-linear freckle transforms as the 'stored features', as a higher level movie screen to be very parochial, but alas, spot on. Random scenes presented to a camera in random motion through normal life (filled with objects around it, as will be the normal case), produce an ant-crawling, wormy movie of primitive features if and when 'visualized' by any one of many techniques that can tap into that live second-level of memory structure. (The freckle-transform's generality allows for >1 dimensional—more than just brightness—data as its output, and thus there are many ways 'to view' this output ultimate presented as brightness variations to a human observer).

So what is to be done with this ant/worm movie? Stereopsis and fine-scale parallax measurements for starters, culminating in 'texture-from-motion' if an application so seeks that. But more generally, this is the carpet of features in motion, and harkening back to the 'operations-per-pixel' tuning of the raw image to feature-vector image transform (preferred being 'freckle), this should be the optimal feature-information-extraction as a function of power consumption/ops-per-pixel.

Now picture walking through a nicely canopied forest in the day time. Your personal device with camera is such that you are not too worried about battery drain, so the dimensionality of the freckle transform is increased to higher settings, allowing for a richer 7-dimensional ant/worm movie to be showing up on the co-extensive memory plane. What is going to happen to these worms? [Worms here is just a fun way to describe 7-dimensional vectors and how those vector values change as a function of the two-dimensions of the camera frame!]. Most fundamentally of all, these 7D worms are going to roil, boil, come and go. Structures will form and then they will vanish. As we pan our camera through the canopy or just have it still as we walk along, the carpet of features will generally correlate to the gross motions of the scene and the general forms of objects in the scene (trunks of trees, one's companions, etc.). So fundamentally, these 'features' are statistical in nature and objects in a scene will 'mostly but not 100%' correlate with each other frame to frame. So the primitive features attached to that tree-trunk over there, one frame to the next, will have some higher correlation of 7D feature vector vectors, but never perfect correlation. Previous disclosure sections describe the subsequent common operations to be applied to these 7D vector planes: previously called 'carpet matching' replete with translation, scaling, rotation, carpet stretching, 'fold identification' in the carpet, 'tearing' in the carpet, one compared to another This list here is deliberately high level since the underlying primitive features can be the input to most if not all 'prior art' methodologies which owe their existence to 'some set of image features'. Indeed, one interim step of processing, performed directly on these GPU/VPU/SOC's, is to transform lower level freckle vectors into classic higher level 'edges', 'corners' and the vast array of 'current art features' that power modern visual processing.

Thus, borrowing again from animal neural vision, there is no innate limit to the number of 'spatial-relationship-preserving' memory layers that can ride on top of the baseline freckle vector plane. Indeed, alternate embodiments might even skip the freckle vector primitive plane and go right for producing higher level structural planes resulting directly in 'feature corners with such-n-such orientation'. Such a higher level plane 'visualized movie' would be less worm/ant like and would be more recognizably correlated to the actual visual scene being imaged, since by definition it would be not be driven by the information asymptote of image-feature density.

Concluding this section, carpet-of-features real-time processing will be an inherent benefactor of the current trends toward getting kernel-based processing closer and closer to image sensors. Memory structures with spatial-relationship-preserving properties physically store the outputs of these processing steps, making the processed data available to any number of layers of further processing, either on the sensor-chip, near the sensor chip, or even in the cloud.

ICP Support for Development Programmers

In this instantiation of ICP, Object Recognition on mobile cameras is equivalent to initiating an interactive session with that Object.

Such interactions often cleanly separate into commercial vs. non-commercial in nature.

Those who own the object recognition event will own the session.

While this section refers to visual recognition, the principles apply to audio recognition as well.

The baseline scenario is a single user with one camera, basic device processing, display, positioning capabilities and wireless communication. The user points the camera at scenes/objects in real-time, and objects within those scenes go through various states of 'session supported' recognition, with and/or without displaying those states on a user's screen. Users can directly select objects for more focused interaction, or have objects indirectly selected for them based on a wide variety of conditions.

Broadening the Bauble

We extend the concept of the 'Bauble,' described in 20110161076, which is incorporated above. In this extension of Baubles, Baubles have a strongly dual identity: being the visually displayed icons that dominated our earliest descriptions of baubles, but now also taking on a heavy development programming role as well.

'Latent' Baubles are identity structures that get assigned to both proto-objects and clearly delineated objects in any given frame or set of frames from the camera. These 'L-Baubles' are graphically assigned to the 'center' of an object in question.

An L0-Bauble is a candidate form of an object either within a single frame or roughly tracked across more than one frame. Many to dozens to hundreds of L0-Baubles might exist in any given frame or short sequence of frames. A temporary unique L0-identification number is assigned to such image-pixel-based objects—arbitrarily 'placed' at the center of those pixels. Depth cameras and structure-from-motion techniques can provide additional information in the formulation and constant churning of the L0-list, on top of baseline pixel-only segmentation techniques producing that fast-changing list. The fate of most L0-Bauables is to exist for a short time and then vanish, giving up its temporary ID or at least relegating it to mid-term memory. The color code for L0-Baubles is Red.

An L1-Bauble is a graduated L0-Bauble that has passed threshold levels of stability and delineation such that a given degree of confidence is attained that there exists 'a discrete object and/or scene-element' in one or more frames. Specifically, some discretely identifiable grouping of pixels (sometimes with fuzzy edges) has been 'parsed' and is generally 'trackable' across multiple frames. Again, depth cameras and structure-from-motion techniques can greatly supplement more classic pixel-based techniques in producing the confidence levels needed to assign an L1-Bauble identification number to some region of pixels. Scene-objects such as a background lake, or 'sky', may qualify for L1-Bauble identification number status. L1-Baubles may begin an independent-thread cloud-session interaction, most usually involved with sending or receiving information which will assist in either graduating an L1-Bauble to a higher level of Bauble, or, to receive instructions to actively ignore some given specific L1-Bauble. Statistics and basic characteristics surrounding L1-Bauble list roiling can also be recorded by the cloud. The color code for L1-Baubles is blue.

An L2-Bauble is a graduated L1-Bauble that has attained some threshold level of stability of discreteness and trackability as well as having been successfully type-identified. The classic 'human face' will be immediately assigned an L2-identification number (by-passing L0 and L1 IDs) even in a single frame assuming that the face is clearly identifiable as a face. Whereas L0 and L1 Baubles have rather generic data structures associated with the unique identified objects, L2 data structures will build upon those generic data structures with type-specific data fields as well. A richer form of unique-thread cloud interaction is also associated with each and every L2 bauble identification number. Indeed, given that a user may immediately or eventually wish to focus in on a new L2-Bauble, initiated by either direct intentionality by the user or by indirect 'alerting' programmed by the user's innate interests, in both case the foundations for an interactive session with that L2-bauble is set up as part of the very assignment of an L2-identification number to that object. Thus, an L2-identification number assignment is a kind of first level object recognition event, and as stated in the first sentence of this document, this is equivalent to '... initiating an interactive session with that Object.' The cloud will mirror the L2-Bauble identification number and will begin to anticipate and prepare for immediate or eventual user interaction with that Bauble. The color code for L2-Baubles is yellow.

An L3-Bauble is attached to a precisely identified object or thing (in the case of, say, a lake). Thresholds of confidence on this identification will be application-specific, but in general will be quite stringent. The range of identification may still be wide in the case of generic Coke cans, or specific to unique things. It will often be the case that some L2-Bauble takes a few tenths of a second to even a few minutes to graduate from an L2-Bauble state to an L3-Bauble state, generally based on the cloud-session interchange initiated as part of its L2-Bauble ID registration. In the case of digital watermark reading, some arbitrary surface in a single initial frame can be 'read' and instantly go from being just a patch of pixels to an L3-Bauble identification number, so a 'progression of L-Bauble states will not always be necessary. Walking into a crowded antique store armed with a camera connected to top-of-the-line L2-Bauble support cloud services, a user can witness a few dozen yellow L2-Baubles turn from yellow into green L3-Baubles in the matter of a few seconds, as 'green' is the color code for L3-Baubles.

This latter sentence about 'watching' Baubles turn from yellow to green is a transition to describing the more historic use of the term 'Bauble'. L0, L1, L2 and L3 Baubles all have their 'D' or 'Displayed' equivalents, where the behind-the-scenes data structures here described are made visible to either/both the user and development programmers as they build and debug their programs. Hence, a D2-Bauble indicates that some L2-Bauble in the current L2-Bauble list has been selected for actual virtual reality overlay on a user (or developers) screen. The L2 data structures are left intact, while they are now supplemented by a D2-Bauble data structure which contains a variety of graphic-display-relevant data, starting with what type of graphic icon will be used to place at the center of the object as it is displayed on a screen.

Thus, D-Baubles, the displayable (and displayed) version of Baubles, becomes an important distinction between the plumbing level form of Baubles, L-Baubles, that developers and programmers generally spend most of their time dealing with as data structures, and the actual visual form of Baubles that UX-developers and general users will be more dealing with. US Patent Application Publication 20110161076, cited above, laid out the design and functional descriptions of these now-called D-Baubles, so this section will leave their description here as a relation one to L-Baubles.

D-baubles are quite nicely fitting the iceberg analogy of being the visible part, while there is a great deal more below the surface in the L-Baubles and their cloud-interaction dynamics. The next section explores these cloud dynamics further.

Baubles and Business

As noted above, we believe that those who own the object recognition event will own the session. The very act of creating a temporary or more permanent ID of some 'sensed object' inside a real-time personal device session is by definition the beginning of interacting with that sensed object. The act of labelling the object and creating a data structure to begin to flesh out its description kicks off a whirlwind of activity as previously described. The programming software which performs this act of initial object identification, be it on a local device with the camera or be it in the cloud, is also the logical place where the raw plumbing for link connections and entire object-session-interaction ought to happen. The software which performs these acts is the de facto 'owner' of the interaction session between a user and their subsequent desires related to the object.

The magnitude of this very simple principle could not be more profound. An immediate 'business battleground' is quietly created in the process. To wit, will the software which performs this initial object identification event and initializes its subsequent interactive session management simply be a switch board which directs 'traffic' to the creators/owners of the sensed objects—an identified coke can directs at least part of the control of the session to Coca-Cola the corporation and/or its assignee service affiliate—or will the session be managed by some behemoth cloud services company which may or may not have a business relationship with Coca-Cola?

The inevitability is that both scenarios will happen and many hybrids in between these 'object owner' vs. 'pan-property' extremes. History is the overarching proof on this statement, where both for media property as well as for physical product property, there have been many past battles where software and services surrounding those properties try to funnel 'traffic' toward web services largely directed by the owners of those properties versus web services directed by large scale aggregators.

For the purposes of this disclosure, user-object-interaction sessions can accommodate all extremes here, with then the marketplace and the legal system allowing for the next ten years of market development and business competition to choose winners and losers on the business side.

'Object recognition services' provided to the global public choose a business winner: the one who initially best serves their simplest needs relative to object recognition, staving off in the process the intense forces trying to overtly commercialize the initial forays.

This means creating simple tools for a broadly based programmer and development community with the express purpose of empowering high quality and ever growing content surrounding objects. Many developers and programmers do not care about the pixel processing behind object recognition nor the 6 dimensional gymnastics behind structure-from-motion, but they can completely run with a stable L2-Bauble or L3-Bauble and begin to create and serve up compelling and useful UX experiences surrounding 'things' in the Internet of Things.

The next section continues in this 'developer/programmer friendly' vein and extends the discussion to IT engineers and technicians, exploring further the necessary details behind 'object-based-routing' and how an eco-system of value suppliers can build and provide content and UX experiences customized for single objects, families of objects (such as brands and product categories; or plants, animals, buildings, etc.) and other general object-linking and traffic-monitoring and analysis services.

Object-Based-Router: OBR

The current industry surrounding digitally watermarked objects long has had the behind-the-scenes need to match IDs to things. Barcodes have been doing the same for over forty years, and more recently QR-codes and other overt identification symbologies have been doing the same. Ultimately, even text recognition which can 'identify' a coke can or some cover of a book, belies a database system matching objects/things to identification tags and database entries.

To empower the Internet of Things, replete with all of the evolving connections between things and 'stuff about things', newer concepts and database designs are required which make look-up-table based databases quite obsolete.

In our earlier work, we described various ways to implement these connections between forms of content and object identification, on the one hand, and delivery of related information (metadata), including network services of various kinds, on the other. These connections are "dynamic" meaning the connections of the object to metadata or services may be updated over time. See, for example, U.S. Pat.

Nos. 6,122,403, 6,947,571 and US Patent Publication 2007-0208711, which are hereby incorporated by reference. In these approaches, the original object owner or creator may control the initial registration of the connection between an object identification and metadata/services, and in addition, additional parties may also register such connections. For example, schemes for enabling service providers and distributors to bid on the opportunity to provide the connection are supported through such systems for dynamic connections. Different connections may apply depending on the context and requesting party, such as in the case of location based services using a location based router system. For more on location based router architectures, please see US Patent Publication 2014-0164124, which is hereby incorporated by reference. These types of architectures for enabling parties to register connections between objects and services will at least set up a technical basis for legal treatments of what third parties can and cannot do with 'owner registered objects/things.'

Overview of Electronic Device Architecture

Figure 15:
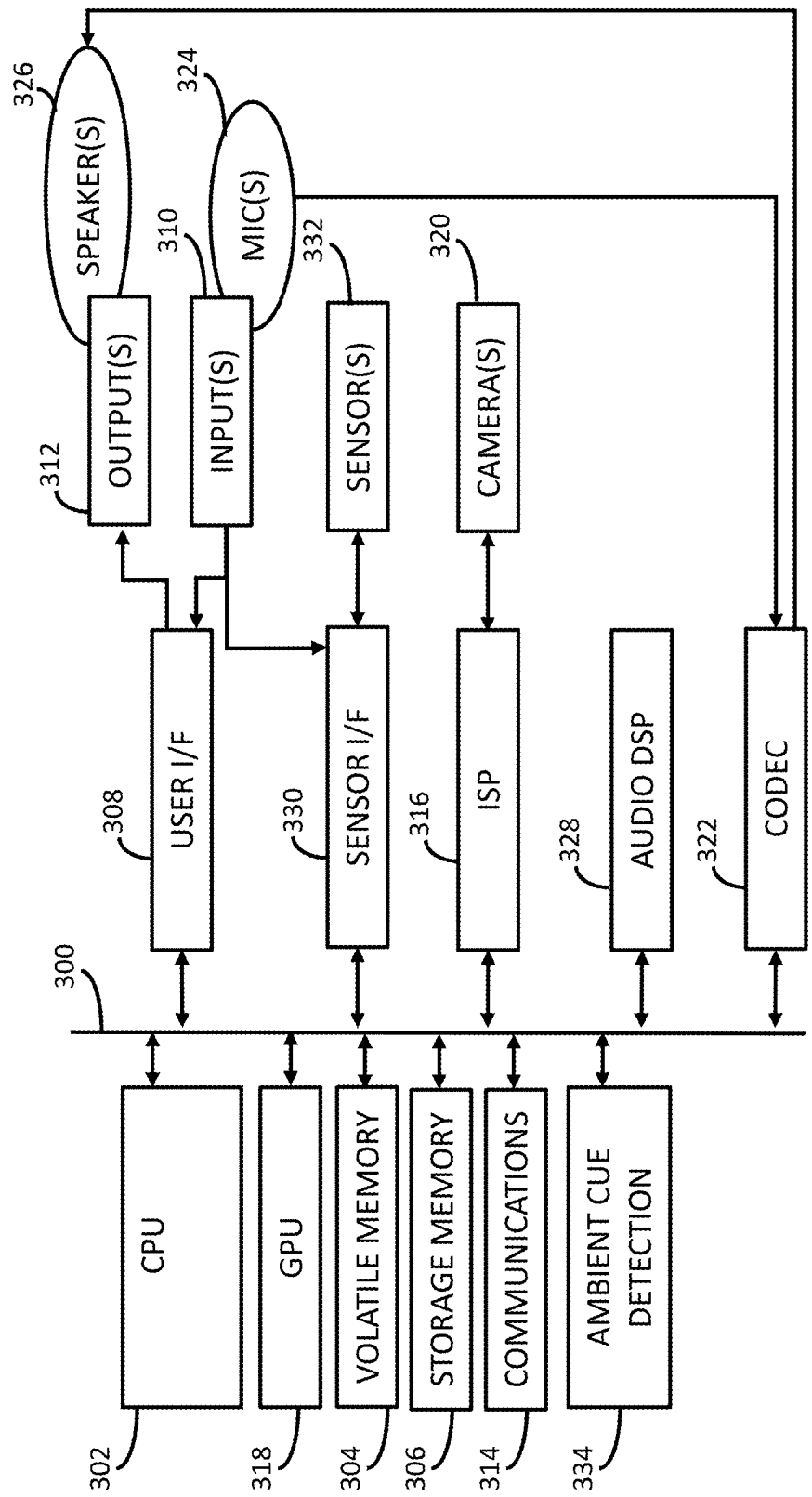
FIG. 15 illustrates a functional block diagram of a portable electronic device configured for low-power, ambient signal processing.

FIG. 15 illustrates a functional block diagram of a portable electronic device configured for low-power, ambient signal processing.

Referring to FIG. 15, the electronic device includes bus 300, to which many components, modules, etc. (each generically referred as a "component") are communicatively coupled. The bus 300 may combine the functionality of a direct memory access (DMA) bus and a programmed input/output (PIO) bus. In other words, the bus 300 may facilitate both DMA transfers and direct CPU read and write instructions. In one embodiment, the bus 300 is one of the Advanced Microcontroller Bus Architecture (AMBA®) compliant data buses. Although FIG. 15 illustrates an embodiment in which all components are communicatively coupled to the bus 300, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 302. The CPU 302 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 302 runs the operating system of the electronic device and manages the various functions of the electronic device. The CPU 302 may include or be coupled to a read-only memory (ROM) (not shown), which may hold the operating system and/or other device firmware that runs on the electronic device.

The electronic device may also include a volatile memory 304 electrically coupled to bus 300. The volatile memory 304 may include, for example, any type of random access memory (RAM), and may also include non-volatile memory devices, such as ROM, EPROM and EEPROM or some combination of volatile and non-volatile memory. Although not shown, the electronic device may further include a memory controller that controls the flow of data to and from the volatile memory 304.

The electronic device may also include a storage memory 306 connected to the bus. The storage memory 306 may include flash memory, such as, for example, NOR or NAND flash memory, but may also include any kind of electronic storage device, such as, for example, magnetic or optical disks. In embodiments of the invention, the storage memory is used to store software and certain data files. Examples of "software" include system software (e.g., including operating system software, one or more utility programs that help manage and tune one or more of the aforementioned components, or the like or any combination thereof), application software (e.g., including middleware, one or more application programs that help users solve problems, perform tasks, render media content, or the like or any combination thereof), a software component (e.g., a device driver, a CODEC, etc.), or other data or parameter that is provided to an application program or online service (e.g., a URL or other identifier such as a YouTube video identifier), or the like or any combination thereof. Examples of "data files" include user preferences, contact information (e.g., phone numbers, email addresses, etc.), pictures, text files, audio files, video files, ring tones, haptic signature files, archived text messages, emails, spatial bookmarks (i.e., saved or pinned addresses or geospatial locations), web browser bookmarks or Internet shortcuts, or the like or any combination thereof.

Also connected to the bus 300 is a user interface module 308. The user interface module 308 is configured to facilitate user control of the electronic device. Thus the user interface module 308 may be communicatively coupled to one or more user input devices 310. A user input device 310 can, for example, include a button, knob, touch screen, trackball, mouse, microphone, an IR or ultrasound-emitting stylus, an ultrasound emitter (e.g., to detect user gestures, etc.), one or more structured light emitters, such as depth capable sensors noted above (e.g., to project structured IR light to detect user gestures, capture a depth map for an image frame from a camera, etc.), or the like or any combination thereof.

The user interface module 308 may also be configured to indicate, to the user, the effect of the user's control of the electronic device, or any other information related to an operation being performed by the electronic device or function otherwise supported by the electronic device. Thus the user interface module 308 may also be communicatively coupled to one or more user output devices 312. A user output device 312 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof. Generally, the user input devices 310 and user output devices 312 are an integral part of the electronic device; however, in alternate embodiments, any user input device 310 (e.g., a microphone, etc.) or user output device 312 (e.g., a loud speaker, haptic actuator, light, display, etc.) may be a physically separate device that is communicatively coupled to the electronic device (e.g., via the communications module 314). Although the user interface module 308 is illustrated as an individual component, it will be appreciated that the user interface module 308 (or portions thereof) may be integrated into one or more other components also connected to the bus 300 (e.g., the CPU 302, the communications module 314, an ambient cue detection module 334, or the like or any combination thereof).

Also connected to the bus 300 is an image signal processor (ISP) 316 and a graphics processing unit (GPU) 318. The ISP and GPU are also intended to encompass alternative integrated circuit arrangements, including GPU, VPU and/or image processor SOC, and combinations thereof. The image signal processor 316 is configured to process imagery (including still-frame imagery, video imagery, or the like or any combination thereof) captured by one or more cameras 320, or by any other image sensors, thereby generating image data. General functions typically performed by the ISP 316 can include Bayer transformation, demosaicing, noise reduction, image sharpening, or the like or any combination thereof. The GPU 318 can be configured to process the image data generated by the ISP 316, thereby generating processed image data, as explained previously with reference to GPU, VPU, and image processor system on a chip (SOC) devices. General functions typically performed by the GPU 318 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components (e.g., the volatile memory 304) via bus 300. The GPU 316 may also be configured to perform one or more video decompression or decoding processes. Image data generated by the ISP 316 or processed image data generated by the GPU 318 may be accessed by the user interface module 308, where it is converted into one or more suitable signals that may be sent to a user output device 312 such as a display.

Also coupled to the bus 300 is an audio CODEC (or, more simply CODEC) 322, which is configured to encode, decode and route data to and from one or more microphone(s) 324 (any of which can be considered to be a user input device 310) and loud speaker(s) 326 (any of which can be considered to be a user output device 310). For example, sound can be present within an ambient, aural environment (e.g., as one or more propagating sound waves) surrounding the electronic device. A sample of such ambient sound can be obtained by capturing the propagating sound wave(s) using one or more microphones 324, and the microphone(s) 324 then convert the captured sound into one or more corresponding analog audio signals (typically, electrical signals). The signal(s) generated by the microphone(s) 324 can then be processed by the CODEC 322 (e.g., to convert the analog audio signals into digital audio signals). The CODEC 322 can also receive digital audio signals from an audio digital signal processor (DSP) such as audio DSP 328, convert each received digital audio signal into one or more corresponding analog audio signals and send the analog audio signals to one or more loudspeakers 326. In one embodiment, the CODEC 322 includes two communication channels (e.g., so that the CODEC 322 can transmit generated audio data and receive audio data simultaneously). Generally, the CODEC 322 is configured to perform any of the operations described above while the CPU 302 is in an "idle," "sleep" or other low power state (e.g., any of states C1 through C3, as defined by the Advanced Configuration and Power Interface (ACPI) Specification, Rev. 5.0a).

The audio DSP 328 performs various processing of digital audio signals generated by the CODEC 322, such as compression, decompression, equalization and mixing of audio from different sources. The audio DSP 328 may include a core processor (e.g., an ARM® AudioDE™ processor, a Hexagon processor (e.g., QDSP6V5A)), as well as a data memory, program memory, DMA channels, one or more input buffers, one or more output buffers, or the like or any combination thereof. Although the CODEC 322 and the audio DSP 328 are illustrated as separate components, it will be appreciated that the CODEC 322 and the audio DSP 328 can be integrally combined. By providing the audio DSP 328, digital audio signals to be sent to, and received from, the CODEC 322 can be processed even while the CPU 302 is in an "idle," "sleep" or other low power state (e.g., any of states C1 through C3, as defined by the Advanced Configuration and Power Interface (ACPI) Specification, Rev. 5.0a). It will nevertheless be appreciated that audio signals to be sent to, and received from, the CODEC 322 can be processed while the CPU 302 is in an active or working state (e.g., state C0, as defined by the ACPI Specification, Rev. 5.0a), and that the CPU 302 can perform any of the operations of the audio DSP 328 if desired or suitable.

The aforementioned communications module 314 includes circuitry, antennas, sensors, and any other suitable or desired technology facilitating communication of data through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 314 may include one or more microprocessors, digital signal processors or other microcontrollers, programmable logic devices, or the like or any combination thereof. Optionally, the communications module 314 includes cache or other local memory (e.g., volatile memory, non-volatile memory or a combination thereof), DMA channels, one or more input buffers, one or more output buffers, or the like or any combination thereof.

Also connected to the bus 300 is a sensor interface module 330 communicatively coupled to one or more sensors 332. A sensor 332 can, for example, include an accelerometer (e.g., for sensing motion, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.) or the like or any combination thereof. Generally, a sensor 332 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 332 coupled to the auxiliary sensor interface module 330 are an integral part of the electronic device; however, in alternate embodiments, one or more of the sensors may be a physically separate device that is communicatively coupled to the electronic device (e.g., via the communications module 314).

The sensor interface module 330 is configured to activate, deactivate or otherwise control an operation (e.g., control sampling rate, sampling range, etc.) of one or more sensors 332 (e.g., in accordance with instructions stored internally or externally in volatile memory 304 or storage memory 306, ROM (not shown), etc., or in accordance with commands issued by the CPU 302, the user interface module 308, the ambient cue detection module 334, etc.). In one embodiment, sensor interface module 330 can encode, decode or otherwise process signals generated by one or more of the sensors 332. These signals can then be routed from the sensor interface module 330 to one or more of the aforementioned components via the bus 300. In another embodiment, however, any signal generated by a sensor 332 can be routed before being processed. By providing the sensor interface module 330, signals generated by the sensors 332 can be processed even while the CPU 302 is in an "idle," "sleep" or other low power state. It will nevertheless be appreciated that signals generated by the sensors 332 can be processed while the CPU 302 is in an active or working state, and that signals generated by the sensors 332 can be processed by the CPU 302 if otherwise desired or suitable.

Generally, the sensor interface module 330 may include one or more microprocessors, digital signal processors or other microcontrollers, programmable logic devices, or the like or any combination thereof. The sensor interface module 330 may also optionally include cache or other local memory (e.g., volatile memory, non-volatile memory or a combination thereof), DMA channels, one or more input buffers, one or more output buffers, and any other component facilitating the functions it supports (as described below). In one embodiment, the sensor interface module may be provided as the "Sensor Core" (Sensors Processor Subsystem (SPS)) from Qualcomm. Although the sensor interface module 330 is illustrated as an individual component, it will be appreciated that the sensor interface module 330 (or portions thereof) may be integrated into one or more other components (e.g., the CPU 302, the communications module 314, the ambient cue detection module 334, or the like or any combination thereof).

Generally, and as will be discussed in greater detail below, the ambient cue detection module 334 is configured to process signal(s) generated by one or more sensors 332 (e.g., one or more microphones 324, etc.), data generated by one or more of the aforementioned components (e.g., the CODEC 322, the audio DSP 328, etc.) or the like or any combination thereof to discern a cue therefrom, with little or no involvement of the CPU 302 and little or no access to the volatile memory 304 or the storage memory 306. By doing so, ambient cues can be discerned without consuming an undesirably high amount of resources associated with the electronic device (e.g., memory, processing bandwidth, power, etc.), even while the CPU 302 is in an "idle," "sleep" or other low power state. It will nevertheless be appreciated that such signals, data etc., can be processed by the ambient cue detection module 334 while the CPU 302 is in an active or working state, and that such signals, data, etc., can be processed by the CPU 302 if otherwise desired or suitable.

The ambient cue detection module 334 may include a microprocessor, digital signal processor or other microcontroller, programmable logic device, or any other processor typically consuming less power than the CPU when in an active or working state. Optionally, the ambient cue detection module 334 includes cache or other local memory (e.g., volatile memory, non-volatile memory or a combination thereof), DMA channels, one or more input buffers, one or more output buffers, and any other component facilitating the functions it supports. Although the ambient cue detection module 334 is illustrated as an individual component, it will be appreciated that the ambient cue detection module 334 may be functionally integrated into one or more other suitable components (e.g., the audio DSP 328, the CODEC 22, the ISP 316, the sensor interface module 330, or the like or any combination thereof).

Constructed as exemplarily described above, the electronic device may be configured as a portable electronic device such as a cellular or mobile phone, a smartphone (e.g., iPhone, offered by Apple; Galaxy, offered by Samsung; Moto X, offered by Motorola), a tablet computer (e.g., the iPad, offered by Apple; the Nexus product-family, offered by Google; the Galaxy product-family, offered by Samsung), a laptop computer, a media player (e.g., an iPod or iPod Nano, offered by Apple), a personal activity tracking device (e.g., the Force, Flex, Zip or One, all offered by Fitbit; the MotoActv, offered by Motorola; the FuelBand, offered by Nike), a smartwatch (e.g., the SmartWatch 2, offered by Sony; the Gear, offered by Samsung; the Toq, offered by Qualcomm), a head-mounted electronic device (e.g., Glass, offered by Google; the M100 or Wrap 1200DX, all offered by Vuzix), etc.), or any other portable or wearable electronic device (e.g., any finger-, wrist-, arm-, leg-, torso-, neck-ear-, head-mountable device, of the like often used for providing a user visual, audible, or tactile notifications regarding incoming email, voicemail, text message, appointments, alerts, etc., for providing a user with the current time-of-day, for providing a user with biofeedback, for tracking or monitoring of a user's physiological function or physical activity, for facilitating hand-free communications via telephone, email, text messaging, etc.), or the like or any combination thereof. Thus, depending on the particular configuration of the electronic device, the electronic device may include more or fewer components than those mentioned above with respect to FIG. 15, and may include additional components (e.g., timing sources such as oscillators, phase-locked loops, etc.; peripherals such as countertimers, real-time timers, power-on reset generators, etc.; analog interfaces such as ADCs and DACs; voltage regulators; power management circuits; direct memory access (DMA) controllers; dedicated or general purpose digital signal processors (DSPs); field programmable gate arrays (FPGAs), or the like or any combination thereof) as would occur to one of ordinary skill. In one embodiment, the electronic device is provided as an evidence-based state machine, a blackboard-based system, or as otherwise described in any of U.S. Pat. Nos. 8,175,617, 8,762,852 and 8,805,110 and U.S. Patent App. Pub. Nos. 2011/0161076, 2012/0134548 and 2013/0324161, each of which is incorporated herein by reference in its entirety. Generally, the electronic device is provided as a battery-powered electronic device (e.g., containing a rechargeable or replaceable battery). In addition, or alternatively, the electronic device may be powered by one or more solar cells, fuel cells, thermoelectric generators, or the like or any combination thereof.

Notwithstanding any specific discussion of the embodiments set forth herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, and/or firmware that stores instructions executed by programmable circuitry.

Any of the aforementioned components of the electronic device may, collectively or individually, be embodied as circuitry that forms part of a larger or distributed system, for example, an integrated circuit (IC), a mobile application processor, a system on-chip (SOC) (e.g., like the Snapdragon product-family from Qualcomm), desktop computer, or any other electronic device or network thereof (e.g., wireless, wired, ad-hoc, Internet, local area network, personal area network, body area network, wireless sensor network, or the like or any combination thereof), or the like or any combination thereof. Moreover, while certain chipset architectures have been explicitly discussed above, it will be appreciated that the discussion is not intended to be limiting and that the embodiments disclosed herein are to be broadly construed to encompass current architectures and many variations.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations described above may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types.

The particular combinations of elements and features in the above-detailed embodiments are exemplary only; the interchanging and substitution of these teachings with other teachings in this and the incorporated-by-reference patents/applications are also contemplated.

I claim:

1. A method of obtaining surface detail of an object from a video sequence captured by a moving camera over the object, the method comprising:

providing a camera model and the video sequence;

using a hardware processor of a computer system, determining pose estimation from the video sequence using the camera model;

using a hardware processor of a computer system, registering images from different frames using the pose estimation;

using a hardware processor of a computer system, performing a feature vector transform on the images to produce N-dimensional feature vector per pixel of the images, the feature vector transform producing for each pixel in an array of pixels, a first vector component corresponding to plural comparisons between a center pixel and pixels at plural directions around the center pixel for a first scale, and second vector component corresponding to plural comparisons between the center pixel and pixels at plural directions around the center pixel for a second scale;

using a hardware processor of a computer system, correlating the feature vector transforms of the images to obtain shift measurements between the images; and using a hardware processor of a computer system, obtaining surface height detail of the object from the shift measurements.

2. The method of claim 1 wherein the determining of pose estimation comprises:

performing a feature vector transform on frames of the video sequence, the feature vector transform producing for each pixel in an array of pixels, a vector component corresponding to plural comparisons between a center pixel and pixels at plural directions around the center pixel;

using a hardware processor, finding shifts between a first feature vector transformed frame and at least a second feature vector transformed frame; and using a hardware processor, determining the pose estimation from the shifts.

3. The method of claim 1 wherein the plural comparisons at the first and second scales comprise quantized differences.

4. The method of claim 3 wherein the quantized differences are encoded in arcs of a ring at the first and second scales.

5. The method of claim 1 wherein the plural comparisons at each of the first and second scales are converted to a gradient.

6. The method of claim 5 wherein the gradient comprises a magnitude and direction to produce at least two vector components per scale.

7. The method of claim 1 wherein providing the video sequence comprises obtaining the video sequence from a mobile device camera, which captures the video sequence as the mobile device camera is moved over the object.

8. The method of claim 1 wherein the hardware processor comprises a hardware processor in a mobile device comprising the mobile device camera.

9. A non-transitory computer readable medium on which is stored instructions, which when executed by one or more processors, perform a method of obtaining surface detail of an object from a video sequence captured by a moving camera over the object, the method comprising:

determining pose estimation from the video sequence using a camera model;

registering images from different frames using the pose estimation;

performing a feature vector transform on the images to produce N-dimensional feature vector per pixel of the images, the feature vector transform producing for each pixel in an array of pixels, a first vector component corresponding to plural comparisons between a center pixel and pixels at plural directions around the center pixel for a first scale, and second vector component corresponding to plural comparisons between the center pixel and pixels at plural directions around the center pixel for a second scale;

correlating the feature vector transforms of the images to obtain shift measurements between the images; and obtaining surface height detail of the object from the shift measurements.

10. The computer readable medium of claim 9 wherein the determining of pose estimation comprises:

performing a feature vector transform on frames of the video sequence, the feature vector transform producing for each pixel in an array of pixels, a vector component corresponding to plural comparisons between a center pixel and pixels at plural directions around the center pixel;

finding shifts between a first feature vector transformed frame and at least a second feature vector transformed frame; and determining the pose estimation from the shifts.

11. The computer readable medium of claim 9 wherein the plural comparisons at the first and second scales comprise quantized differences.

12. The computer readable medium of claim 11 wherein the quantized differences are encoded in arcs of a ring at the first and second scales.

13. The computer readable medium of claim 9 wherein the plural comparisons at each of the first and second scales are converted to a gradient.

14. The computer readable medium of claim 13 wherein the gradient comprises a magnitude and direction to produce at least two vector components per scale.

15. A mobile device comprising:

a camera for capturing a video sequence of an object, the video sequence comprising plural frames;

a processor programmed with instructions that configure the processor to:

determine pose estimation from the video sequence using a camera model;

align images from different frames using the pose estimation;

perform a feature vector transform on the images to produce N-dimensional feature vectors per pixel of the images, the feature vector transform producing for each pixel in an array of pixels, a first vector component corresponding to plural comparisons between a center pixel and pixels at plural directions around the center pixel for a first scale, and second vector component corresponding to plural comparisons between the center pixel and pixels at plural directions around the center pixel for a second scale;

correlate the feature vector transforms of the images to obtain shift measurements between the images; and obtain surface height detail of the object from the shift measurements.

16. A system for obtaining surface detail of an object from a video sequence captured by a moving camera over the object, the system comprising:

means for estimating pose of the object relative to the camera from the video sequence;

means for transforming the images into dense feature vector arrays, the feature vector arrays comprising a feature vector per pixel, the feature vector having a first vector component corresponding to plural comparisons between a center pixel and pixels at plural directions around the center pixel for a first scale, and second vector component corresponding to plural comparisons between the center pixel and pixels at plural directions around the center pixel for a second scale; and means for obtaining surface height detail of the object from the dense feature vector arrays.

17. The system of claim 16 wherein the means for estimating pose comprises a processor programmed with instructions to:

determine a coarse 6D pose from the video sequence based on a camera model;

obtain dense feature vector transforms of images in the video sequence;

align the feature vector transforms with the coarse 6D pose; and determine a refined 6D pose from the aligned feature vector transforms.

18. The system of claim 16 wherein the means for obtaining surface height detail comprises a processor programmed with instructions to:

obtain shift measurements between the images from the dense vector arrays; and obtain surface height detail of the object from the shift measurements.

* * * * *